United States Patent
Larsson et al.

(10) Patent No.: US 10,021,681 B2
(45) Date of Patent: Jul. 10, 2018

(54) USER EQUIPMENT, NETWORK NODE AND METHODS THEREIN FOR DETERMINING A TRANSPORT BLOCK SIZE IN DOWNLINK TRANSMISSIONS IN A TELECOMMUNICATIONS SYSTEM

(71) Applicant: Telefonaktiebolaget LM Ericsson (publ), Stockholm (SE)

(72) Inventors: Daniel Larsson, Vallentuna (SE); Jung-Fu Cheng, Fremont, CA (US); Mattias Frenne, Uppsala (SE); Johan Furuskog, Stockholm (SE); Havish Koorapaty, Saratoga, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 98 days.

(21) Appl. No.: 15/385,080

(22) Filed: Dec. 20, 2016

(65) Prior Publication Data

US 2017/0105200 A1    Apr. 13, 2017

Related U.S. Application Data

(63) Continuation of application No. 14/376,489, filed as application No. PCT/SE2012/050627 on Jun. 11, 2012.

(Continued)

(51) Int. Cl.
*H04W 72/04* (2009.01)
*H04W 74/00* (2009.01)
(Continued)

(52) U.S. Cl.
CPC ......... *H04W 72/042* (2013.01); *H04L 1/0007* (2013.01); *H04L 1/0015* (2013.01);
(Continued)

(58) Field of Classification Search
CPC ...................................................... H04W 74/00
See application file for complete search history.

(56) References Cited

FOREIGN PATENT DOCUMENTS

| CN | 101291514 A | 10/2008 |
|---|---|---|
| CN | 101651515 A | 2/2010 |

(Continued)

OTHER PUBLICATIONS

Japanese Notice of Ground for Rejection, Patent Application No. 2014-555526—dated Apr. 26, 2016.

(Continued)

*Primary Examiner* — Huy D Vu
*Assistant Examiner* — Teisha D Hall
(74) *Attorney, Agent, or Firm* — Baker Botts, LLP

(57) ABSTRACT

A method in a user equipment (121) for determining a transport block size is provided. The transport block size is used by the user equipment (121) in receiving downlink data transmissions from a network node (110) on an enhanced Control CHannel, eCCH. The user equipment (121) and the network node (110) are comprised in a telecommunications system (100). The user equipment (121) has access to a table of predetermined transport block sizes. The user equipment (121) may calculate an indicator $N_{PRB}$ based on the total number of PRBs allocated to the downlink data transmission $N_{PRB}$, and based on an PRB offset value $O_{PRB}$ or a PRB adjustment factor APRB. Then, the user equipment (121) may determine the transport block size from the table of predetermined transport block sizes based on at least the calculated indicator $N_{PRB}$. A user equipment, a method in network node and a network node are also provided.

28 Claims, 16 Drawing Sheets

Related U.S. Application Data

(60) Provisional application No. 61/595,226, filed on Feb. 6, 2012.

(51) Int. Cl.
*H04L 1/00* (2006.01)
*H04L 5/00* (2006.01)
*H04L 27/26* (2006.01)
*H04W 88/08* (2009.01)

(52) U.S. Cl.
CPC .......... *H04L 5/0044* (2013.01); *H04L 5/0053* (2013.01); *H04L 27/2627* (2013.01); *H04W 74/006* (2013.01); *H04W 88/08* (2013.01)

(56) References Cited

FOREIGN PATENT DOCUMENTS

| CN | 101964697 A | 2/2011 |
|----|-------------|--------|
| CN | 101291514 B | 1/2012 |
| CN | 101651515 B | 12/2012 |
| WO | 2010/139269 A1 | 12/2010 |
| WO | 2011/047253 A1 | 4/2011 |
| WO | 2013/097364 A1 | 7/2013 |

OTHER PUBLICATIONS

PCT Notification of Transmittal of the International Preliminary Report on Patentability for International Application No. PCT/SE2012/050627—dated Feb. 24, 2014.
PCT International Search Report for International Application No. PCT/SE2012/050627—dated Aug. 31, 2012.
3GPP TSG-RAN WG1 Meeting #66bis; Zhuhai, China, Agenda item: 7.5.3.2.; Source: Renesas Mobile Europe Ltd.; Title: E-PDCCH design aspsect (R1-113174)—Oct. 10-14, 2011.
3GPP TSG-RAN WG1 #66bis; Zhuhai, China; Source: Ericsson, ST-Ericsson; Title: On Enhanced PDCCH design (R1-112928)—Oct. 10-14, 2011.
3GPP TSG RAN WG1 Meeting #64; Taipei, Taiwan; Agenda Item: 6.2.5; Source: LG Electronics; Title: Un PDSCH Transmission (R1-110885)—Feb. 21-25, 2011.
3rd Generation Partnership Project; Technical Specification Group Radio Access Network; Evolved Universal Terrestrial Radio Access (E-UTRA); Physical Layer Procedures (Release 10) (pp. 34-39)—2011.
3GPP TSG-RAN WG1 #63bis; Dublin, Ireland; Agenda Item: 6.2.5; Source: CMCC, CATT; Title: Un TBS Determination (R1-110423)—Jan. 17-21, 2011.
The Patent Office of the People's Republic of China, Notification of the First Office Action (PCT Application in the National Phase) with English translation and Search Report, Application No. 201280069042X, 9 total pages, dated Jan. 24, 2017.

| CQI index | Modulation | Coding rate x 1024 | Spectral efficiency (bits per symbol) |
|---|---|---|---|
| 0 | out of range | | |
| 1 | QPSK | 78 | 0.15 |
| 2 | QPSK | 120 | 0.23 |
| 3 | QPSK | 193 | 0.38 |
| 4 | QPSK | 308 | 0.60 |
| 5 | QPSK | 449 | 0.88 |
| 6 | QPSK | 602 | 1.18 |
| 7 | 16QAM | 378 | 1.48 |
| 8 | 16QAM | 490 | 1.91 |
| 9 | 16QAM | 616 | 2.47 |
| 10 | 64QAM | 466 | 2.73 |
| 11 | 64QAM | 567 | 3.32 |
| 12 | 64QAM | 666 | 3.90 |
| 13 | 64QAM | 772 | 4.52 |
| 14 | 64QAM | 873 | 5.12 |
| 15 | 64QAM | 948 | 5.55 |

Fig. 5

| MCS Index ($I_{MCS}$) | Modulation ($Q_m$) | Transport block size index ($I_{TBS}$) |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | 16QAM | 9 |
| 11 | 16QAM | 10 |
| 12 | 16QAM | 11 |
| 13 | 16QAM | 12 |
| 14 | 16QAM | 13 |
| 15 | 16QAM | 14 |
| 16 | 16QAM | 15 |
| 17 | 64QAM | 15 |
| 18 | 64QAM | 16 |
| 19 | 64QAM | 17 |
| 20 | 64QAM | 18 |
| 21 | 64QAM | 19 |
| 22 | 64QAM | 20 |
| 23 | 64QAM | 21 |
| 24 | 64QAM | 22 |
| 25 | 64QAM | 23 |
| 26 | 64QAM | 24 |
| 27 | 64QAM | 25 |
| 28 | 64QAM | 26 |
| 29 | QPSK | reserved |
| 30 | 16QAM | |
| 31 | 64QAM | |

Fig. 6

| MCS Index ($I_{MCS}$) | Modulation ($Q_m$) | Spectral efficiency (bits per symbol) |
|---|---|---|
| 0 | QPSK | 0.23 |
| 1 | QPSK | 0.31 |
| 2 | QPSK | 0.38 |
| 3 | QPSK | 0.49 |
| 4 | QPSK | 0.60 |
| 5 | QPSK | 0.74 |
| 6 | QPSK | 0.88 |
| 7 | QPSK | 1.03 |
| 8 | QPSK | 1.18 |
| 9 | QPSK | 1.33 |
| 10 | 16QAM | 1.33 |
| 11 | 16QAM | 1.48 |
| 12 | 16QAM | 1.70 |
| 13 | 16QAM | 1.91 |
| 14 | 16QAM | 2.16 |
| 15 | 16QAM | 2.41 |
| 16 | 16QAM | 2.57 |
| 17 | 64QAM | 2.57 |
| 18 | 64QAM | 2.73 |
| 19 | 64QAM | 3.03 |
| 20 | 64QAM | 3.32 |
| 21 | 64QAM | 3.61 |
| 22 | 64QAM | 3.90 |
| 23 | 64QAM | 4.21 |
| 24 | 64QAM | 4.52 |
| 25 | 64QAM | 4.82 |
| 26 | 64QAM | 5.12 |
| 27 | 64QAM | 5.33 |
| 28 | 64QAM | 6.25 |

Fig. 7

| Operation mode | | Number of OFDM symbols for control information | | | | |
|---|---|---|---|---|---|---|
| | | 0 | 1 | 2 | 3 | 4 |
| FDD, TDD | Normal CP | 14 | 13 | 12 | 11 | 10 |
| | Extended CP | 12 | 11 | 10 | 9 | 8 |
| TDD DwPTS normal CP | configurations 1, 6 | 9 | 8 | 7 | 6 | 5 |
| | configurations 2, 7 | 10 | 9 | 8 | 7 | 6 |
| | configurations 3, 8 | 11 | 10 | 9 | 8 | 7 |
| | configuration 4 | 12 | 11 | 10 | 9 | 8 |
| TDD DwPTS extended CP | configurations 1, 5 | 8 | 7 | 6 | 5 | 4 |
| | configurations 2, 6 | 9 | 8 | 7 | 6 | 5 |
| | configuration 3 | 10 | 9 | 8 | 7 | 6 |

Fig. 13

| MCS index ($I_{MCS}$) | Modulation | Available number of OFDM symbols for PDSCH ($N_{OS}$) | | | | | | |
|---|---|---|---|---|---|---|---|---|
| | | 14 | 13 | 12 | 11 | 10 | 9 | 8 |
| 0 | QPSK | 0.09 | 0.10 | 0.11 | 0.12 | 0.13 | 0.14 | 0.16 |
| 1 | QPSK | 0.12 | 0.13 | 0.14 | 0.16 | 0.17 | 0.19 | 0.21 |
| 2 | QPSK | 0.15 | 0.16 | 0.17 | 0.19 | 0.21 | 0.23 | 0.26 |
| 3 | QPSK | 0.19 | 0.21 | 0.22 | 0.25 | 0.27 | 0.30 | 0.34 |
| 4 | QPSK | 0.24 | 0.25 | 0.28 | 0.30 | 0.33 | 0.37 | 0.41 |
| 5 | QPSK | 0.29 | 0.31 | 0.34 | 0.37 | 0.41 | 0.45 | 0.51 |
| 6 | QPSK | 0.35 | 0.37 | 0.40 | 0.44 | 0.48 | 0.54 | 0.61 |
| 7 | QPSK | 0.40 | 0.44 | 0.47 | 0.52 | 0.57 | 0.63 | 0.71 |
| 8 | QPSK | 0.46 | 0.50 | 0.54 | 0.58 | 0.65 | 0.72 | 0.81 |
| 9 | QPSK | 0.52 | 0.56 | 0.61 | 0.67 | 0.73 | 0.81 | 0.91 |
| 10 | 16QAM | 0.26 | 0.28 | 0.30 | 0.33 | 0.37 | 0.41 | 0.46 |
| 11 | 16QAM | 0.29 | 0.31 | 0.34 | 0.37 | 0.41 | 0.45 | 0.51 |
| 12 | 16QAM | 0.33 | 0.36 | 0.39 | 0.43 | 0.47 | 0.52 | 0.58 |
| 13 | 16QAM | 0.38 | 0.40 | 0.44 | 0.48 | 0.53 | 0.58 | 0.66 |
| 14 | 16QAM | 0.42 | 0.46 | 0.50 | 0.54 | 0.59 | 0.66 | 0.74 |
| 15 | 16QAM | 0.47 | 0.51 | 0.55 | 0.60 | 0.66 | 0.74 | 0.83 |
| 16 | 16QAM | 0.50 | 0.54 | 0.59 | 0.64 | 0.71 | 0.79 | 0.88 |
| 17 | 64QAM | 0.34 | 0.36 | 0.39 | 0.43 | 0.47 | 0.52 | 0.59 |
| 18 | 64QAM | 0.36 | 0.39 | 0.42 | 0.46 | 0.50 | 0.56 | 0.63 |
| 19 | 64QAM | 0.40 | 0.43 | 0.46 | 0.51 | 0.56 | 0.62 | 0.69 |
| 20 | 64QAM | 0.43 | 0.47 | 0.51 | 0.55 | 0.61 | 0.68 | 0.76 |
| 21 | 64QAM | 0.47 | 0.51 | 0.55 | 0.60 | 0.66 | 0.74 | 0.83 |
| 22 | 64QAM | 0.51 | 0.55 | 0.60 | 0.65 | 0.72 | 0.79 | 0.89 |
| 23 | 64QAM | 0.55 | 0.59 | 0.64 | 0.70 | 0.77 | 0.86 | 0.96 |
| 24 | 64QAM | 0.59 | 0.64 | 0.69 | 0.75 | 0.83 | 0.92 | 1.04 |
| 25 | 64QAM | 0.63 | 0.68 | 0.74 | 0.80 | 0.88 | 0.98 | 1.10 |
| 26 | 64QAM | 0.67 | 0.72 | 0.78 | 0.85 | 0.94 | 1.04 | 1.17 |
| 27 | 64QAM | 0.70 | 0.75 | 0.81 | 0.89 | 0.98 | 1.09 | 1.22 |
| 28 | 64QAM | 0.82 | 0.88 | 0.95 | 1.04 | 1.15 | 1.27 | 1.43 |

Fig. 14

| MCS index ($I_{MCS}$) | Modulation | Available number of OFDM symbols for PDSCH ($N_{os}$) | | | | | | | | |
|---|---|---|---|---|---|---|---|---|---|---|
| | | 12 | 11 | 10 | 9 | 8 | 7 | 6 | 5 | 4 |
| 0 | QPSK | 0.08 | 0.09 | 0.09 | 0.11 | 0.12 | 0.14 | 0.16 | 0.19 | 0.24 |
| 1 | QPSK | 0.11 | 0.12 | 0.13 | 0.14 | 0.16 | 0.18 | 0.21 | 0.26 | 0.32 |
| 2 | QPSK | 0.13 | 0.14 | 0.16 | 0.17 | 0.20 | 0.22 | 0.26 | 0.31 | 0.39 |
| 3 | QPSK | 0.17 | 0.18 | 0.20 | 0.22 | 0.25 | 0.29 | 0.34 | 0.40 | 0.51 |
| 4 | QPSK | 0.21 | 0.23 | 0.25 | 0.28 | 0.31 | 0.35 | 0.41 | 0.50 | 0.62 |
| 5 | QPSK | 0.25 | 0.28 | 0.31 | 0.34 | 0.38 | 0.44 | 0.51 | 0.61 | 0.76 |
| 6 | QPSK | 0.30 | 0.33 | 0.36 | 0.40 | 0.45 | 0.52 | 0.61 | 0.73 | 0.91 |
| 7 | QPSK | 0.35 | 0.39 | 0.42 | 0.47 | 0.53 | 0.61 | 0.71 | 0.85 | |
| 8 | QPSK | 0.41 | 0.44 | 0.49 | 0.54 | 0.61 | 0.70 | 0.81 | | |
| 9 | QPSK | 0.46 | 0.50 | 0.55 | 0.61 | 0.69 | 0.79 | | | |
| 10 | 16QAM | 0.23 | 0.25 | 0.27 | 0.30 | 0.34 | 0.39 | 0.46 | 0.55 | 0.69 |
| 11 | 16QAM | 0.25 | 0.28 | 0.31 | 0.34 | 0.38 | 0.44 | 0.51 | 0.61 | 0.76 |
| 12 | 16QAM | 0.29 | 0.32 | 0.35 | 0.39 | 0.44 | 0.50 | 0.58 | 0.70 | 0.88 |
| 13 | 16QAM | 0.33 | 0.36 | 0.39 | 0.44 | 0.49 | 0.56 | 0.66 | 0.79 | |
| 14 | 16QAM | 0.37 | 0.41 | 0.45 | 0.50 | 0.56 | 0.64 | 0.74 | 0.89 | |
| 15 | 16QAM | 0.41 | 0.45 | 0.50 | 0.55 | 0.62 | 0.71 | 0.83 | | |
| 16 | 16QAM | 0.44 | 0.48 | 0.53 | 0.59 | 0.66 | 0.76 | 0.88 | | |
| 17 | 64QAM | 0.29 | 0.32 | 0.35 | 0.39 | 0.44 | 0.50 | 0.59 | 0.71 | 0.88 |
| 18 | 64QAM | 0.31 | 0.34 | 0.38 | 0.42 | 0.47 | 0.54 | 0.63 | 0.75 | |
| 19 | 64QAM | 0.35 | 0.38 | 0.42 | 0.46 | 0.52 | 0.60 | 0.69 | 0.83 | |
| 20 | 64QAM | 0.38 | 0.42 | 0.46 | 0.51 | 0.57 | 0.65 | 0.76 | | |
| 21 | 64QAM | 0.41 | 0.45 | 0.50 | 0.55 | 0.62 | 0.71 | 0.83 | | |
| 22 | 64QAM | 0.45 | 0.49 | 0.54 | 0.60 | 0.67 | 0.77 | 0.89 | | |
| 23 | 64QAM | 0.48 | 0.53 | 0.58 | 0.64 | 0.72 | 0.83 | | | |
| 24 | 64QAM | 0.52 | 0.57 | 0.62 | 0.69 | 0.78 | 0.89 | | | |
| 25 | 64QAM | 0.55 | 0.60 | 0.66 | 0.74 | 0.83 | | | | |
| 26 | 64QAM | 0.59 | 0.64 | 0.70 | 0.78 | 0.88 | | | | |
| 27 | 64QAM | 0.61 | 0.67 | 0.73 | 0.81 | | | | | |
| 28 | 64QAM | 0.72 | 0.78 | 0.86 | | | | | | |

Fig. 15

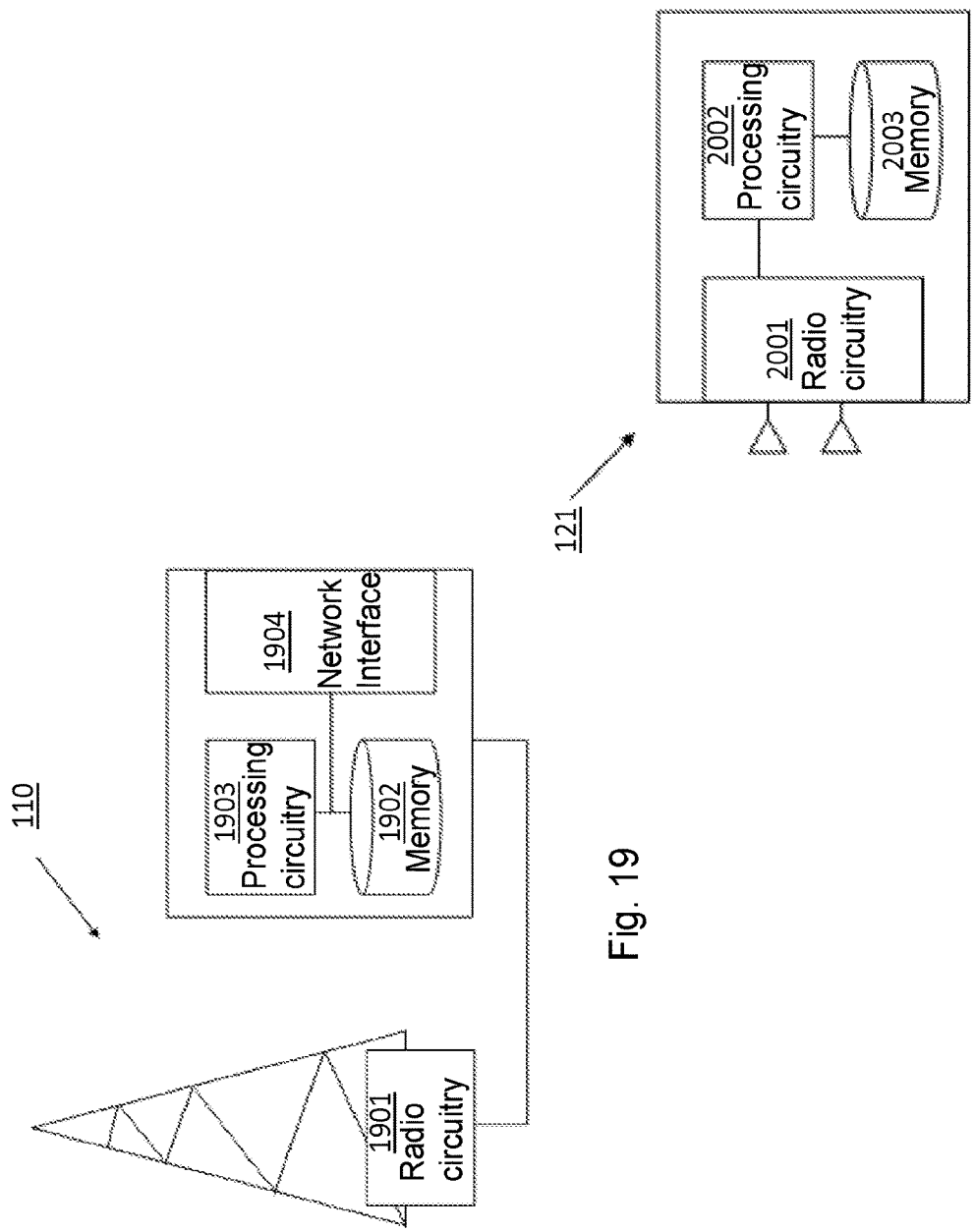

USER EQUIPMENT, NETWORK NODE AND METHODS THEREIN FOR DETERMINING A TRANSPORT BLOCK SIZE IN DOWNLINK TRANSMISSIONS IN A TELECOMMUNICATIONS SYSTEM

PRIORITY

This application is a continuation of U.S. application Ser. No. 14/376,489 filed on Aug. 4, 2014 entitled "User Equipment, Network Node And Methods Therein For Determining A Transport Block Size In Downlink Transmissions In A Telecommunications System", which is a U.S. National Stage Filing under 35 U.S.C. § 371 of International Patent Application Serial No. PCT/SE2012/050627, filed Jun. 11, 2012 and entitled "User Equipment, Network Node And Methods Therein For Determining A Transport Block Size In Downlink Transmissions In A Telecommunications System," which claims the benefit of U.S. Provisional Application No. 61/595,226, filed Feb. 6, 2012 all of which are encorporated by reference in their entirety herein.

TECHNICAL FIELD

Embodiments herein relate to a network node, a user equipment and methods therein. In particular, embodiments herein relate to determining a transport block size of downlink transmissions in a telecommunications system.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

Long Term Evolution (LTE) is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE technology is a mobile broadband wireless communication technology in which transmissions are sent using orthogonal frequency division multiplexing (OFDM), wherein the transmissions are sent from base stations, also referred to herein as network nodes or eNBs, to mobile stations, also referred to herein as user equipments or UEs. The transmission OFDM splits the signal into multiple parallel sub-carriers in frequency.

A basic unit of transmission in LTE is a Resource Block (RB) which in its most common configuration comprises 12 subcarriers and 7 OFDM symbols in one time slot. A unit of one subcarrier and 1 OFDM symbol is referred to as a resource element (RE), as shown in FIG. 1. Thus, an RB comprises 84 REs.

Accordingly, a basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies for subcarriers having a subcarrier spacing $\Delta f$ are defined along an z-axis and symbols are defined along an x-axis.

In the time domain, LTE downlink transmissions are organized into radio frames of 10 ms, each radio frame comprising ten equally-sized sub-frames, #0-#9, each with a $T_{sub-frame}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

An LTE radio sub-frame is composed of multiple RBs in frequency with the number of RBs determining the bandwidth of the system and two slots in time, as shown in FIG. 3. Furthermore, the two RBs in a sub-frame that are adjacent in time may be denoted as an RB pair.

Downlink transmissions are dynamically scheduled in the current downlink subframe. This means that, in each sub-frame, the network node transmits control information about to which UEs data is transmitted, and upon which resource blocks the data is transmitted. This control signalling is typically transmitted in the first 1, 2, 3 or 4 OFDM symbols in each subframe denoted the control region. In FIG. 3, for example, a downlink system with 1 out of 3 possible OFDM symbols as control signalling is illustrated.

The dynamic scheduling information is communicated to the UEs via a Physical Downlink Control CHannel (PDCCH) transmitted in the control region. After successful decoding of a PDCCH, the UE performs reception of the Physical Downlink Shared CHannel (PDSCH) or transmission of the Physical Uplink Shared CHannel (PUSCH) according to a pre-determined timing specified in the LTE specification.

Furthermore, LTE uses Hybrid-ARQ (HARQ). That is, after receiving DL data in a subframe, the UE attempts to decode it and reports to the network node an Acknowledgement (ACK) or a Non-Acknowledgement (NACK) if the decoding was successful or not successful. This is performed via the Physical Uplink Control CHannel (PUCCH). In case of an unsuccessful decoding attempt, the network node may retransmit the erroneous data.

Similarly, the network node may indicate to the UE an Acknowledgement (ACK) or a Non-Acknowledgement (NACK) if the decoding of the PUSCH was successful or not successful via the Physical Hybrid ARQ Indicator CHannel (PHICH).

The DL Layer-1/Layer 2 (L1/L2) control signalling transmitted in the control region comprises the following different physical-channel types:

The Physical Control Format Indicator CHannel (PCFICH). This informs the UE about the size of the control region, e.g. one, two, or three OFDM symbols for system bandwidths larger than 10 RBs and two, three or four OFDM symbols for system bandwidths equal to 10 RBs or smaller. There is one and only one PCFICH on each component carrier or, equivalently, in each cell.

The Physical Downlink Control CHannel (PDCCH). This is used to signal DL scheduling assignments and UL scheduling grants. Each PDCCH typically carries signalling for a single UE, but can also be used to address a group of UEs. Multiple PDCCHs can exist in each cell.

The Physical Hybrid-ARQ Indicator CHannel (PHICH). This is used to signal hybrid-ARQ acknowledgements in response to UL-SCH transmissions. Multiple PHICHs can exist in each cell.

These physical channels are organized in units of Resource Element Group (REG), which comprises four closely spaced resource elements. The PCFICH occupies four REGs and a PHICH group occupies three REGs. An example of control channels in an LTE control region, assuming a system bandwidth of 8 RBs, is shown in FIG. 4.

Physical Downlink Control CHannel (PDCCH)

The PDCCH is used to carry Downlink Control Information (DCI), such as, e.g. scheduling decisions and power-control commands. More specifically, the DCI comprises:

Downlink scheduling assignments. These may comprise PDSCH resource indication, transport format, hybrid-ARQ information, and control information related to spatial multiplexing (if applicable). A downlink scheduling assignment also comprises a command for power control of the PUCCH used for transmission of hybrid-ARQ acknowledgements in response to downlink scheduling assignments.

Uplink scheduling grants. These comprise PUSCH resource indication, transport format, and hybrid-ARQ-related information. An uplink scheduling grant also comprises a command for power control of the PUSCH.

Power-control commands for a set of UEs, which may serve as a complement to the commands comprised in the scheduling assignments/grants.

As multiple UEs may be scheduled simultaneously, on both DL and UL, there must be a possibility to transmit multiple scheduling messages within each subframe. Each scheduling message is transmitted on a separate PDCCH, and consequently there are typically multiple simultaneous PDCCH transmissions within each cell. To accommodate multiple UEs, LTE defines so-called search spaces. The search spaces describe the set of CCEs which the UE is supposed to monitor for scheduling assignments/grants relating to a certain component carrier. A UE has multiple search spaces, namely, UE-specific search spaces and the common search space.

Fast link adaptation to a fading channel condition is used in radio communication network to enhance system throughput capacity, as well as, user experience and quality of services. An important factor in the working of fast link adaptation is the timely update of channel conditions that is fed back from the receiver to the transmitter. The feedback may take on several related forms, such as, e.g. a signal to noise ratio (SNR), a signal to interference and noise ratio (SINR), a received signal level (e.g. power or strength), supportable data rates, supportable combination of modulation and coding rates, supportable throughputs, etc. As the information may also pertain to entire frequency bands, as in W-CDMA systems, or specific portions of it as made possible by systems based OFDM such as the LTE system. These feedback messages may generally be referred to as a Channel Quality Indicator (CQI).

In DL data operations in LTE, the CQI messages are fed back from the UE to the network node to assist the transmitter in the network node in the decision of radio resource allocation. The feedback information may, for example, be used to determine transmission scheduling among multiple receivers; to select suitable transmission schemes, such as, e.g. the number of transmit antennas to activate; to allocate appropriate amount of bandwidth; and to form supportable modulation and coding rate for the intended receiver in the UE.

In UL data operations in LTE, the network node may estimate the channel quality from the Demodulation Reference Symbols (DRS) or Sounding Reference Symbols (SRS) transmitted by the UEs.

The range of a CQI message in LTE is shown in the CQI message table of FIG. 5. This table is the table 7.2.3-1 present in the standard specification 3GPP TS 36.213 "Physical Layer Procedures". This CQI message table has been specifically designed to support Modulation and Coding Scheme (MCS) adaptation over wide-band wireless communication channels. The transition points from a lower-order modulation to a higher-order modulation have been verified with extensive link performance evaluation. These specific transition points between different modulations thus provide a guideline for well-adjusted system operation.

Based on the CQI message from a UE, a network node may choose the best MCS to transmit data on the PDSCH. The MCS information is conveyed to the selected UE in a 5-bit "modulation and coding scheme" field ($I_{MCS}$) of the DCI, as shown in the MCS table of FIG. 6. The MCS field $I_{MCS}$ signals to the UE both the modulation $Q_m$ and the transport block size (TBS) index $I_{TBS}$. In conjunction with the total number of allocated RBs, the TBS index $I_{TBS}$ further determines the exact transport block size used in the PDSCH transmission. The last three MCS entries are for HARQ retransmissions and, hence, the TBS remains the same as the original transmission.

The specific TBSs for different number of allocated radio blocks are defined and listed for the single layer transmission case in the TBS table 7.1.7.2.1-1, i.e. a large 27×110 table, in the standard specification 3GPP TS 36.213 "Physical Layer Procedures". However, these TBSs are designed to achieve spectral efficiencies matching the CQI messages. More specifically, the TBSs are selected to achieve the spectral efficiencies shown in the table of FIG. 7.

Note that the CQI message table in FIG. 5 and, consequently, the MCS table of FIG. 6, are both designed based on the assumption that 11 OFDM symbols are available for PDSCH transmission. This means that when the actual number of available OFDM symbols for PDSCH is different than 11, the spectral efficiency of the transmission will deviate from the spectral efficiencies shown in the table of FIG. 7.

Enhanced Control Channel (eCCH)

Transmission of a Physical Downlink Shared CHannel (PDSCH) to UEs may use REs in RB pairs that are not used for control messages or RS. Further, the PDSCH may either be transmitted using the UE-specific reference symbols or the CRS as a demodulation reference, depending on the transmission mode. The use of UE-specific RS allows a multi-antenna network node to optimize the transmission using pre-coding of both data and reference signals being transmitted from the multiple antennas so that the received signal energy increases at the UE. Consequently, the channel estimation performance is improved and the data rate of the transmission could be increased.

In LTE Release 10, a Relay Physical Downlink Control CHannel is also defined and denoted R-PDCCH. The R-PDCCH is used for transmitting control information from network node to Relay Nodes (RN). The R-PDCCH is placed in the data region, hence, similar to a PDSCH transmission. The transmission of the R-PDCCH may either be configured to use CRS to provide wide cell coverage, or RN specific reference signals to improve the link performance towards a particular RN by precoding, similar to the PDSCH with UE-specific RS. The UE-specific RS is in the latter case used also for the R-PDCCH transmission. The R-PDCCH occupies a number of configured RB pairs in the system bandwidth and is thus frequency multiplexed with the PDSCH transmissions in the remaining RB pairs, as shown in FIG. 8.

FIG. 8 shows a downlink sub-frame showing 10 RB pairs and transmission of 3 R-PDCCH, that is, red, green or blue, of size 1 RB pair each. The R-PDCCH does not start at OFDM symbol zero to allow for a PDCCH to be transmitted in the first one to four symbols. The remaining RB pairs may be used for PDSCH transmissions.

In LTE Release 11 discussions, attention has turned to adopt the same principle of UE-specific transmission as for the PDSCH and the R-PDCCH for enhanced control channels, that is, including PDCCH, PHICH, PBCH, and Physical Configuration Indication CHannels (PCFICH). This may be done by allowing the transmission of generic control messages to a UE using such transmissions to be based on UE-specific reference signals. This means that precoding gains may be achieved also for the control channels. Another benefit is that different RB pairs may be allocated to different cells or different transmission points within a cell. Thereby, inter-cell interference coordination between control channels may be achieved. This frequency coordination is not possible with the PDCCH, since the PDCCH spans the whole bandwidth.

FIG. 9 shows an enhanced PDCCH (ePDCCH) which, similar to the CCE in the PDCCH, is divided into multiple groups (eREG) and mapped to one of the enhanced control regions. However, it should be noted that the relation between ePDCCH, eREGs and REs is not yet determined in the 3GPP standard. One option could be that the relation between ePDCCH and eREGs/REs are to be similar to that as for PDCCH, i.e. that one ePDCCH is divided into one or multiple eCCE(s) corresponding to 36 REs, which in turn is divided into 9 eREGs each comprising 4 REs. Another option may be to have one eCCE corresponding to up to 36 REs, and wherein each eREG corresponds to 18 REs. According to yet another option, it may be decided that the eCCE should correspond to even more than 36 REs, such as, e.g. 72 or 74.

That is, FIG. 9 shows a downlink sub-frame showing a CCE belonging to an ePDCCH that is mapped to one of the enhanced control regions, to achieve localized transmission.

Note that, in FIG. 9, the enhanced control region does not start at OFDM symbol zero, to accommodate simultaneous transmission of a PDCCH in the sub-frame. However, as was mentioned above, there may be carrier types in future LTE releases that do not have a PDCCH, in which case the enhanced control region could start from OFDM symbol zero within the sub-frame.

Time Division Duplex (TDD)

Transmission and reception from a UE may be multiplexed in the frequency domain, in the time domain or in a combination of the two domains, such as, e.g. the half-duplex FDD. FIG. 10 shows an illustration of Frequency Division Duplex (FDD) and Time Division Duplex (TDD).

Frequency Division Duplex (FDD) implies that DL and UL transmissions take place in different, sufficiently separated, frequency bands, while Time Division Duplex (TDD) implies that DL and UL transmissions take place in different, non-overlapping time slots. Thus, TDD may operate in an unpaired spectrum, whereas FDD requires a paired spectrum.

Typically, the structure of the transmitted signal is organized in the form of a frame structure. For example, LTE uses ten equally-sized subframes of length 1 ms per radio frame as illustrated in FIGS. 2 and 11.

As shown in the upper part of FIG. 11, in case of FDD operation, there are two carrier frequencies; one carrier frequency for UL transmission ($F_{UL}$) and one carrier frequency for DL transmission ($F_{DL}$). At least with respect to the UE, FDD may either be full duplex or half duplex. In the full duplex case, a UE may transmit and receive simultaneously, while in half-duplex operation, the UE cannot transmit and receive simultaneously. However, it should be noted that the network node is capable of simultaneous reception or transmission, e.g. receiving from one UE while simultaneously transmitting to another UE. In LTE, a half-duplex UE is monitoring or receiving in the DL except when explicitly being instructed to transmit in a certain subframe.

As shown in the lower part of FIG. 11, in case of TDD operation, there is only a single carrier frequency, and UL and DL transmissions are always separated in time and also on a cell basis. As the same carrier frequency is used for UL and DL transmission, both the network node and the UEs need to switch from transmission to reception and vice versa. An important aspect of any TDD system is to provide the possibility for a sufficiently large guard time, where neither DL nor UL transmissions occur. This is required in order to avoid interference between UL and DL transmissions. For LTE, this guard time is provided by special subframes, e.g. subframe #1 and, in some cases, subframe #6. These are then split into three parts: a downlink part (DwPTS), a guard period (GP), and an uplink part (UpPTS). The remaining subframes are either allocated to UL or DL transmission.

TDD allows for different asymmetries in terms of the amount of resources allocated for UL and DL transmission, respectively, by means of different UL and DL configurations. As shown in FIG. 12, there are seven different configurations in LTE. It should be noted that a DL subframe may mean either a DL subframe or the special subframe.

The LTE system has been designed to support a wide range of operation modes comprising the FDD and the TDD modes. Each of these modes may also operate with normal cyclic prefix (CP) lengths for typical cell sizes or with extended CP lengths for large cell sizes. To facilitate DL to UL switching, some special TDD subframes are configured to transmit user data in the DwPTS with shortened duration.

Furthermore, in the LTE system, available resources may be dynamically appropriated between control information and user data information. For example, the radio resource in a normal subframe is organized into 14 OFDM symbols. The LTE system may dynamically use {0, 1, 2, 3} OFDM symbols or {0, 2, 3, 4} OFDM symbols in case of very small system bandwidths to transmit control information. As a result, the actual number of OFDM symbols available for data transmission is 14, 13, 12, 11 or 10.

A summary of the number of available OFDM symbols for PDSCH transmission in different operation modes is given in the table of FIG. 13.

As previously mentioned, the CQI message table in FIG. 5 and, consequently, the MCS table of FIG. 6, are both designed based on the assumption that 11 OFDM symbols are available for PDSCH transmission. As shown in the table in FIG. 13, there are many cases where the actual resource available for transmission does not match this assumption. Thus, this assumption may lead to mismatch problems when the actual number of OFDM symbols available for PDSCH deviates from the assumed 11 OFDM symbols, which consequently will reduce data throughput.

SUMMARY

It is an object of embodiments herein to provide increased data throughput in a telecommunications system.

According to a first aspect of embodiments herein, the object is achieved by a method in a user equipment for determining a transport block size. The transport block size is used by the user equipment in receiving downlink data transmissions from a network node on an enhanced Control CHannel, eCCH. The user equipment and the network node are comprised in a telecommunications system. The user equipment has access to a table of predetermined transport block sizes. The user equipment calculates an indicator $N_{PRB}$ based on the total number of PRBs allocated to the downlink data transmission $N'_{PRB}$, and based on an PRB offset value $O_{PRB}$ or a PRB adjustment factor $A_{PRB}$. Then, the user equipment determines the transport block size from the table of predetermined transport block sizes based on at least the calculated indicator $N_{PRB}$.

According to a second aspect of embodiments herein, the object is achieved by a user equipment for determining a transport block size. The transport block size is used by the user equipment in receiving downlink data transmissions from a network node on an enhanced Control CHannel, eCCH. The user equipment and the network node are comprised in a telecommunications system. The user equipment has access to a table of predetermined transport block sizes. The user equipment comprises a processing circuitry configured to calculate an indicator $N_{PRB}$ based on the total number of PRBs allocated to the downlink data transmission $N'_{PRB}$, and based on an PRB offset value $O_{PRB}$ or a PRB adjustment factor $A_{PRB}$. The processing circuitry is further configured to determine the transport block size from the table of predetermined transport block sizes based on at least the calculated indicator $N_{PRB}$.

According to a third aspect of embodiments herein, the object is achieved by a method in a network node for determining a transport block size. The transport block size is used by the network node in transmitting downlink data transmissions to the user equipment on an enhanced control channel, eCCH. The network node and the user equipment are comprised in a telecommunications system. The network node has access to a table of predetermined transport block sizes. The network node calculates an indicator $N_{PRB}$ based on the total number of PRBs allocated to the downlink data transmission $N'_{PRB}$, and based on an PRB offset value $O_{PRB}$, or a PRB adjustment factor $A_{PRB}$. Then, the network node determines the transport block size from the table of predetermined transport block sizes based on at least the calculated indicator $N_{PRB}$.

According to a fourth aspect of embodiments herein, the object is achieved by a network node for determining a transport block size. The transport block size is used by the network node in transmitting downlink data transmissions to the user equipment on an enhanced control channel, eCCH. The network node and the user equipment are comprised in a telecommunications system. The network node has access to a table of predetermined transport block sizes. The network node comprises a processing circuitry configured to calculate an indicator $N_{PRB}$ based on the total number of PRBs allocated to the downlink data transmission $N'_{PRB}$, and on an PRB offset value $O_{PRB}$, or a PRB adjustment factor $A_{PRB}$. The processing circuitry is further configured to determine the transport block size from the table of predetermined transport block sizes based on at least the calculated indicator $N_{PRB}$.

When the actual number of OFDM symbols for the downlink data transmissions on an eCCH deviates from the assumed 11 OFDM symbols, the number of suitable modulation and coding schemes (MCSs) generating suitable code rates for the downlink data transmissions will be significantly smaller. By including a PRB offset value $O_{PRB}$, or PRB adjustment factor $A_{PRB}$, in the determining of the transport block size as described above, the user equipment avoids unsuitable modulation and coding schemes. This enables a better scheduling of the downlink data transmissions on the eCCH, since unsuitable code rates, which e.g. may cause the downlink data transmissions to fail and be in need of being retransmitted, is avoided.

Hence, a way of increasing data throughput in a telecommunications system is achieved.

BRIEF DESCRIPTION OF THE DRAWINGS

The above and other features and advantages of the embodiments will become readily apparent to those skilled in the art by the following detailed description of exemplary embodiments thereof with reference to the accompanying drawings, wherein:

FIG. 5 shows a 4-bit CQI message table for LTE, FIG. 6 shows a modulation and TBS index table (MCS table) for LTE PDSCH, FIG. 7 shows a table depicting spectral efficiency for LTE with 11 OFDM symbols for PDSCH, FIG. 13 shows a table depicting the available number of OFDM symbols for PDSCH for different operation modes in LTE, FIG. 14 shows a table depicting the code rate with different number of OFDM symbols for the PDSCH in LTE FDD or TDD non-special subframes, FIG. 15 shows a table depicting the code rate with different number of OFDM symbols for the PDSCH in LTE TDD special subframes, FIG. 19 is a schematic block diagram of embodiments of a network node, FIG. 20 is a schematic block diagram of embodiments of a user equipment.

DETAILED DESCRIPTION

Figure 1:
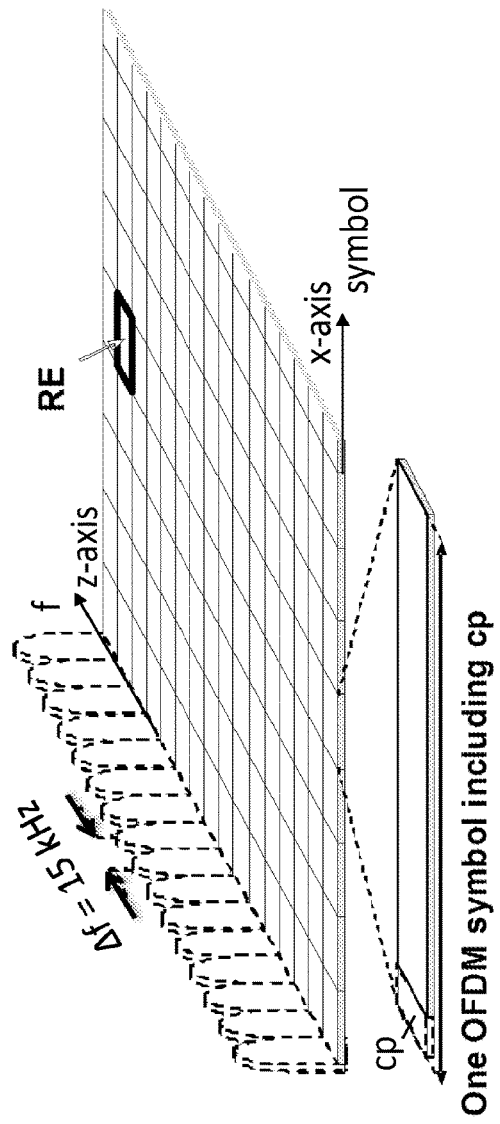
FIG. 1 is a schematic block diagram of a LTE downlink physical resource.
Figure 2:
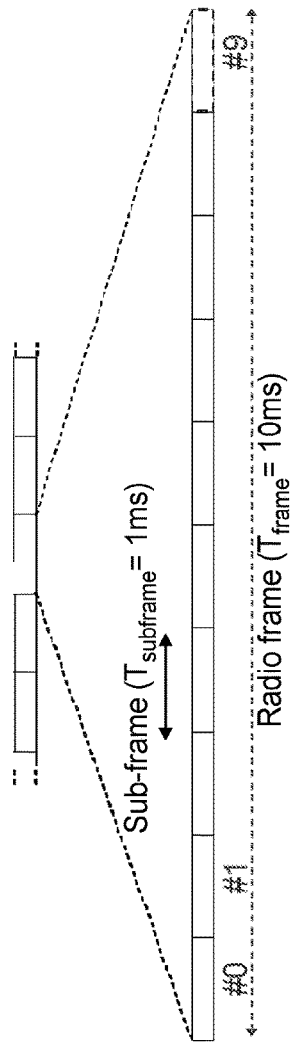
FIG. 2 is a schematic overview depicting radio frames.
Figure 3:
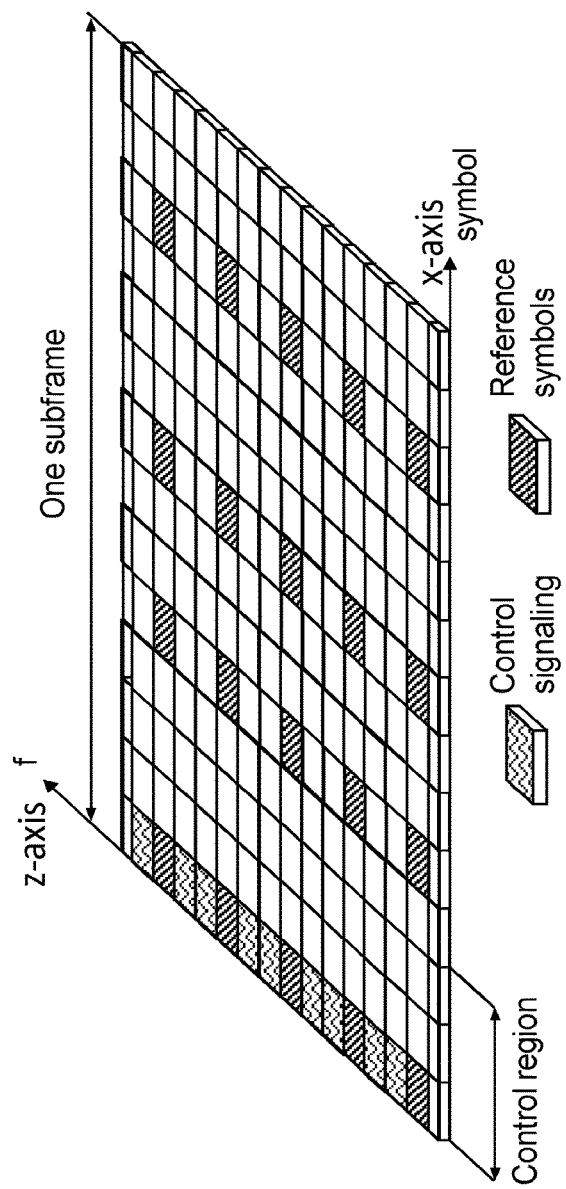
FIG. 3 is a schematic overview depicting a DL sub-frame.
Figure 4:
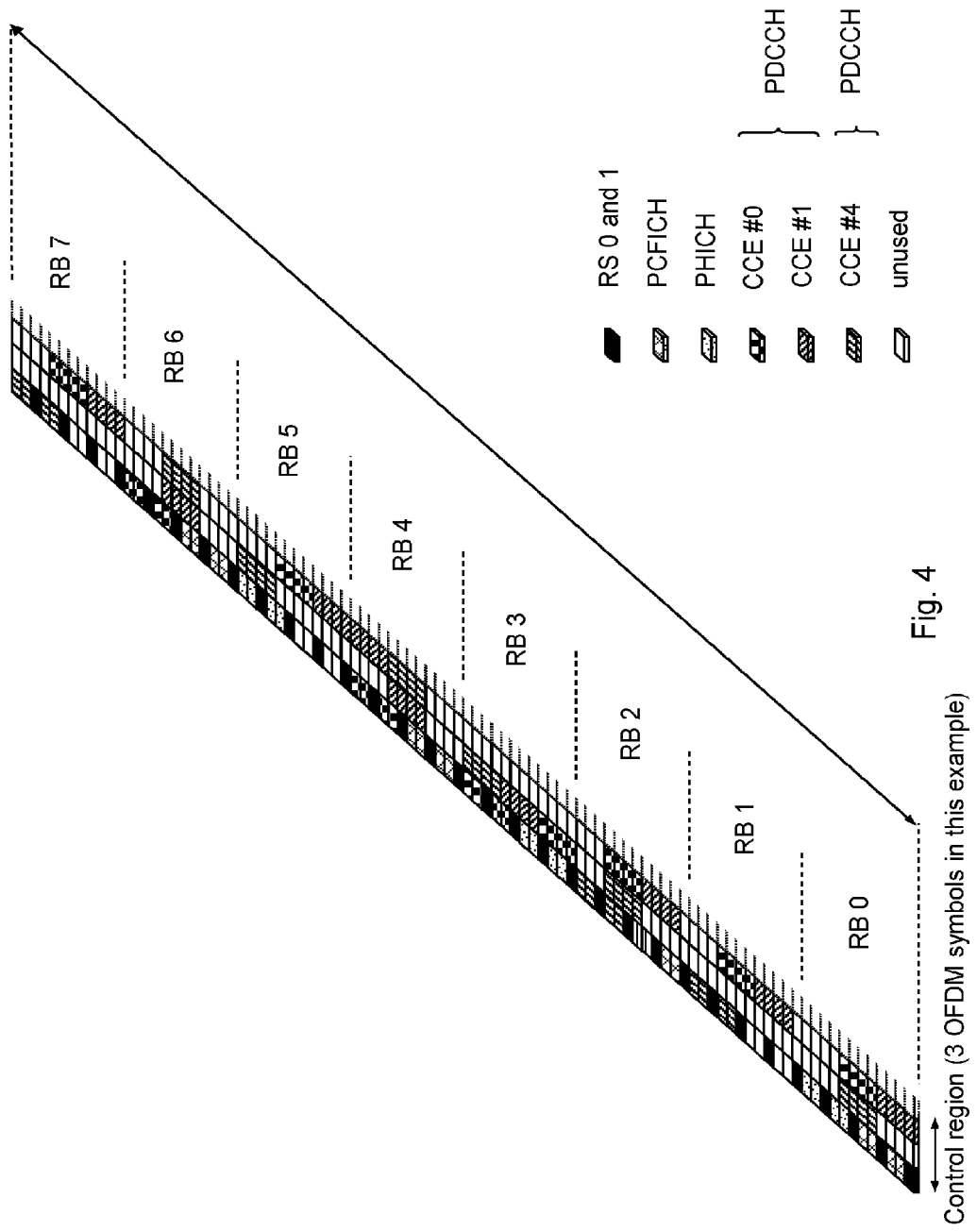
FIG. 4 is a schematic overview depicting control channels in an LTE control region.
Figure 8:
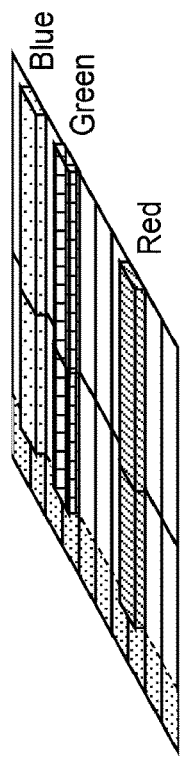
FIG. 8 is a schematic overview depicting a DL sub-frame comprising a relay control channel.
Figure 9:
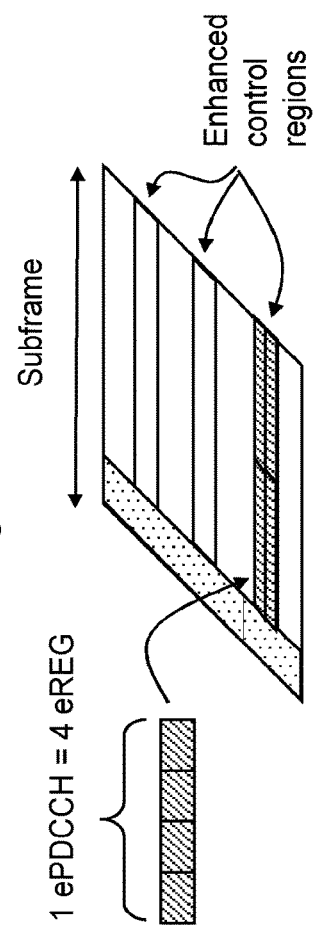
FIG. 9 is a schematic overview depicting a DL sub-frame comprising a CCE belonging to a ePDCCH.
Figure 10:
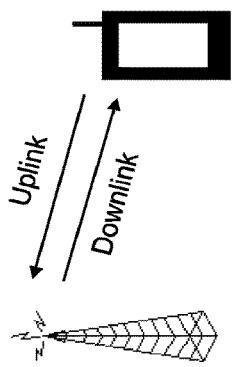
FIG. 10 is a schematic overview depicting Frequency Division Duplex (FDD) and Time Division Duplex (TDD)
Figure 10:
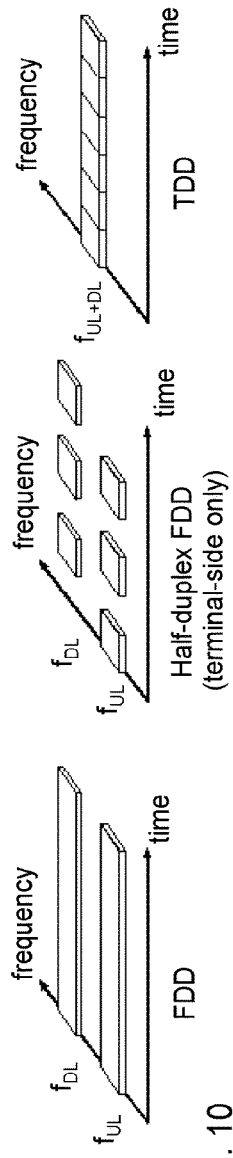
Figure 11:
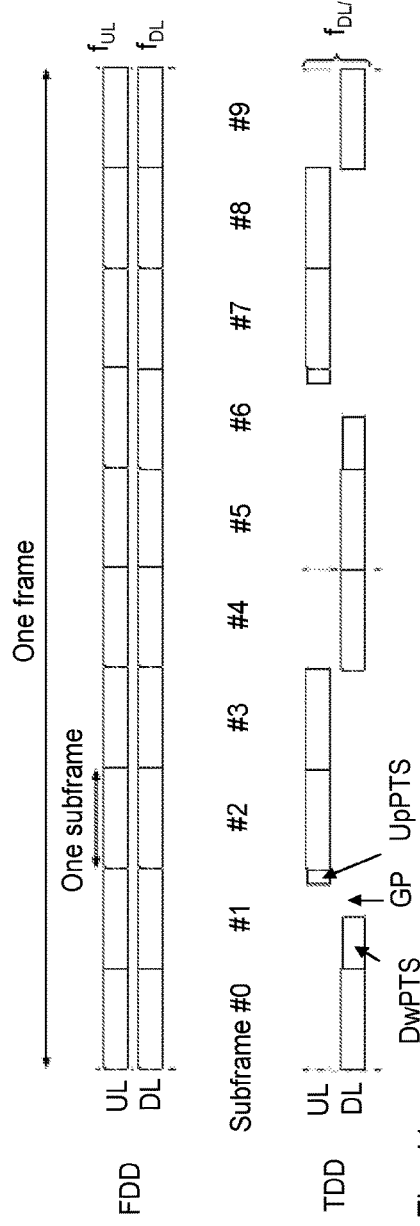
FIG. 11 is a schematic overview depicting a frame structure in time and frequency for LTE in case of Frequency Division Duplex (FDD) and Time Division Duplex (TDD)
Figure 12:
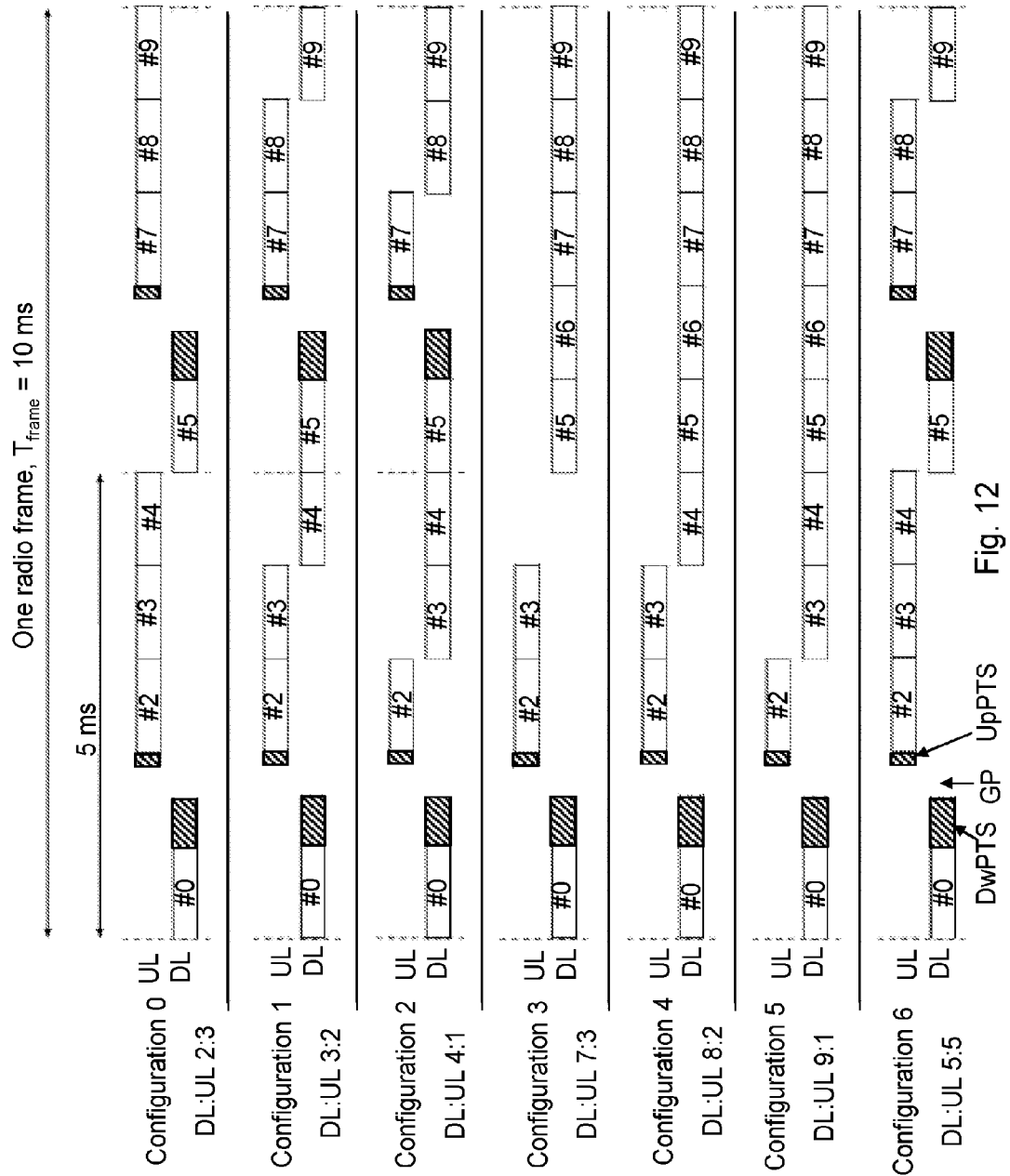
FIG. 12 is a schematic overview depicting different configurations for LTE in case of Time Division Duplex (TDD)

The figures are schematic and simplified for clarity, and they merely show details which are essential to the understanding of the embodiments, while other details have been left out. Throughout, the same reference numerals are used for identical or corresponding parts or steps.

As part of the developing the embodiments described herein, a problem will first be identified and discussed.

In some scenarios, it has been noticed that one way to deal with the obvious mismatch of OFDM symbols in TDD special subframes has been introduced into the standard specification 3GPP TS 36.213 "Physical Layer Procedures".

Normally, for a downlink subframe, the user equipment first calculates the total number of allocated PRBs. The total number of allocated PRBs is based on the PRB resource allocation comprised in the downlink control and the procedure provided in the standard specification 3GPP TS 36.213 "Physical Layer Procedures". The total number of allocated PRBs is denoted $N'_{PRB}$.

Then, the transport block size (TBS) is determined by using $N_{PRB}=N'_{PRB}$ as the column indicator in the TBS Table 7.1.7.2.1-1 in the standard specification 3GPP TS 36.213 "Physical Layer Procedures". The column indicator indicates which column in the TBS table to look in when determining the TBS.

Here, however, if the transport block is transmitted in DwPTS of the TDD special subframe in the frame structure, the TBS is instead determined by the UE by using $N_{PRB}=\max\{\lfloor N'_{PRB}\times 0.75\rfloor,1\}$ as the column indicator for which column to use in the TBS Table 7.1.7.2.1-1 in the standard specification 3GPP TS 36.213 "Physical Layer Procedures".

Unfortunately, this does not fully address the mismatch problems when the actual number of OFDM symbols available for PDSCH deviates from the assumed 11 OFDM symbols, which consequently will reduce data throughput.

This is shown by the tables of FIGS. 14-15. FIG. 14 shows the code rate with different number of OFDM symbols for the PDSCH in LTE FDD or TDD non-special subframes, i.e. for a normal downlink subframe. FIG. 15 shows the code rate with different number of OFDM symbols for the PDSCH in LTE TDD special subframes, e.g. DwPTS.

According to one aspect, it has been observed from the tables of FIGS. 14-15 that the code rate becomes excessively high when the actual number of OFDM symbols for PDSCH is substantially less than the assumed 11 symbols. These cases are indicated by the areas 141, 151 in the tables of FIGS. 14-15. Since the user equipment will not be able to decode such high code rates, transmissions based on these indicated MCSs will fail and retransmissions will be needed.

According to another aspect, it has also been observed that with the mismatch of radio resource assumption, code rates for some of the MCSs deviate out of a suitable range for the wideband wireless system. Based on extensive link performance evaluation, the CQI message table in FIG. 5 has been designed based on that the code rates for QPSK and 16 QAM should not be higher than 0.70, and that the code rates for 16 QAM and 64 QAM should not be lower than 0.32 and 0.40, respectively. As indicated by the areas 142, 152 in the tables of FIGS. 14-15, in some cases, some of the MCSs will result in a sub-optimal, or less suitable, code rate.

According to a further aspect, it has also been observed that in the case of eCCH, a certain number of PRBs are allocated to carry the eCCH. In a low-load scenario, the network node may also schedule a single user equipment to allow peak data rate service for the user equipment. Since the eCCH for this user equipment may occupy at least one PRB, the user equipment cannot be allocated of all downlink PRBs. Since the LTE specifications allow the use of the largest TBS only in conjunction with allocating all downlink PRBs to the user equipment, peak data rate services cannot be provided if an eCCH is deployed. It may therefore be seen that, in the prior art, when the actual number of OFDM symbols for PDSCH deviates from the assumed 11 OFDM symbols, data throughput will be reduced.

Hence, when the actual number of OFDM symbols for the downlink data transmissions on an eCCH deviates from the assumed 11 OFDM symbols, the number of suitable modulation and coding schemes (MCSs) generating suitable code rates for the downlink data transmissions will be significantly smaller. Thus, in these cases, the transport block sizes normally selected by the user equipment based on the total number of PRBs allocated to a downlink data transmission may cause unsuitable modulation and coding schemes (MCSs) to be selected and used for the downlink data transmission. Using such unsuitable modulation and coding schemes may, for example, generate such high code rates in the downlink data transmissions that the downlink data transmissions will fail and retransmissions be needed. This will reduce data throughput in the telecommunications system.

Advantageously, since data throughput is reduced when downlink data transmissions are based on these unsuitable or sub-optimal code rates, the scheduling implementation in the network node and in the user equipment described in at least some of the embodiments herein avoids using any of the MCSs indicated in the areas 151, 152, 161 and 162 shown in the tables of FIGS. 14-15 for the indicated number of OFDM symbols in its downlink data transmissions.

This is performed by instead including a PRB offset value $O_{PRB}$, or PRB adjustment factor $A_{PRB}$, in the determining of the transport block size. This means that the user equipment avoids these unsuitable modulation and coding schemes, which e.g. may cause the downlink data transmissions to fail and be in need of being retransmitted. Thus, a better scheduling of the downlink data transmissions on the eCCH is enabled, achieving an increasing data throughput in the telecommunications system.

It should also be noted that some of the embodiments described herein advantageously avoids complicating the operations of the scheduling algorithms in the network node. This is because some of the unsuitable MCSs that are avoided are located in the middle of the MCS index range. This is otherwise known to complicate the operations of the scheduling algorithms in the network node.

Another advantage of some embodiments described herein is that they allow peak data rates to be achieved in an LTE system configured with eCCHs.

A further advantage of some embodiments described herein is that they further allow fine-tuning of code rates to achieve a better system performance.

Figure 16:
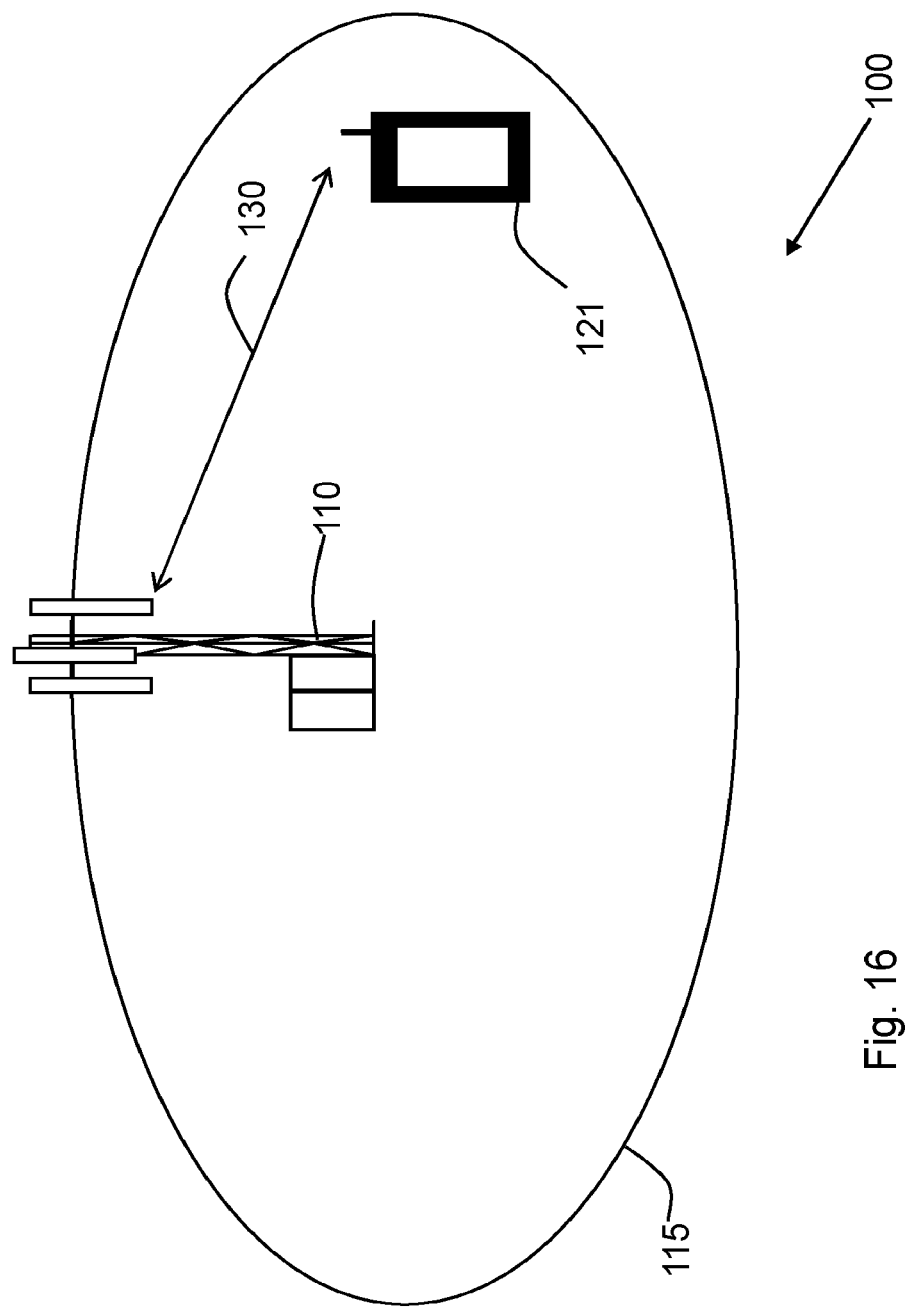
FIG. 16 is a schematic block diagram illustrating embodiments in a telecommunications system.

FIG. 16 depicts a telecommunications system 100 in which embodiments herein may be implemented. The cellular communications system 100 is a wireless communication network such as an LTE, WCDMA, GSM network, any 3GPP cellular network, or any cellular network or system.

The telecommunications system 100 comprises a network node 110, which may be a base station. The network node 110 serves a cell 115. The network node 110 may in this example e.g. be an eNB, an eNodeB, or a Home Node B, a Home eNode B, a femto Base Station (BS), a pico BS or any other network unit capable to serve a user equipment or a machine type communication device which are located in the cell 115 in the telecommunications system 100.

A user equipment 121 is located within the cell 115. The user equipment 121 is configured to communicate within the telecommunications system 102 via the network node 110 over a radio link 130 when the user equipment 121 is present in the cell 115 served by the network node 110. The user equipment 121 may e.g. be a mobile terminal, a wireless terminal, a mobile phone, a computer such as e.g. a laptop, a Personal Digital Assistant (PDA) or a tablet computer, sometimes referred to as a surf plate, with wireless capability, a device equipped with a wireless interface, such as a printer or a file storage device or any other radio network unit capable of communicating over a radio link in a telecommunications system.

Embodiments of a method in the user equipment 121 will now be described with reference to the flowchart depicted in FIG. 17. The flowchart in FIG. 17 describes a method in the user equipment 121 for determining a transport block size. The transport block size is used by the user equipment 121 in receiving downlink data transmissions from the network node 110 on an enhanced Control CHannel, eCCH. The user equipment 121 and the network node 110 are comprised in a telecommunications system 100. The user equipment 121 has access to a table of predetermined transport block sizes. The table of predetermined transport block sizes may, for example, be the TBS table 7.1.7.2.1-1 in the standard specification 3GPP TS 36.213 "Physical Layer Procedures".

Figure 17:
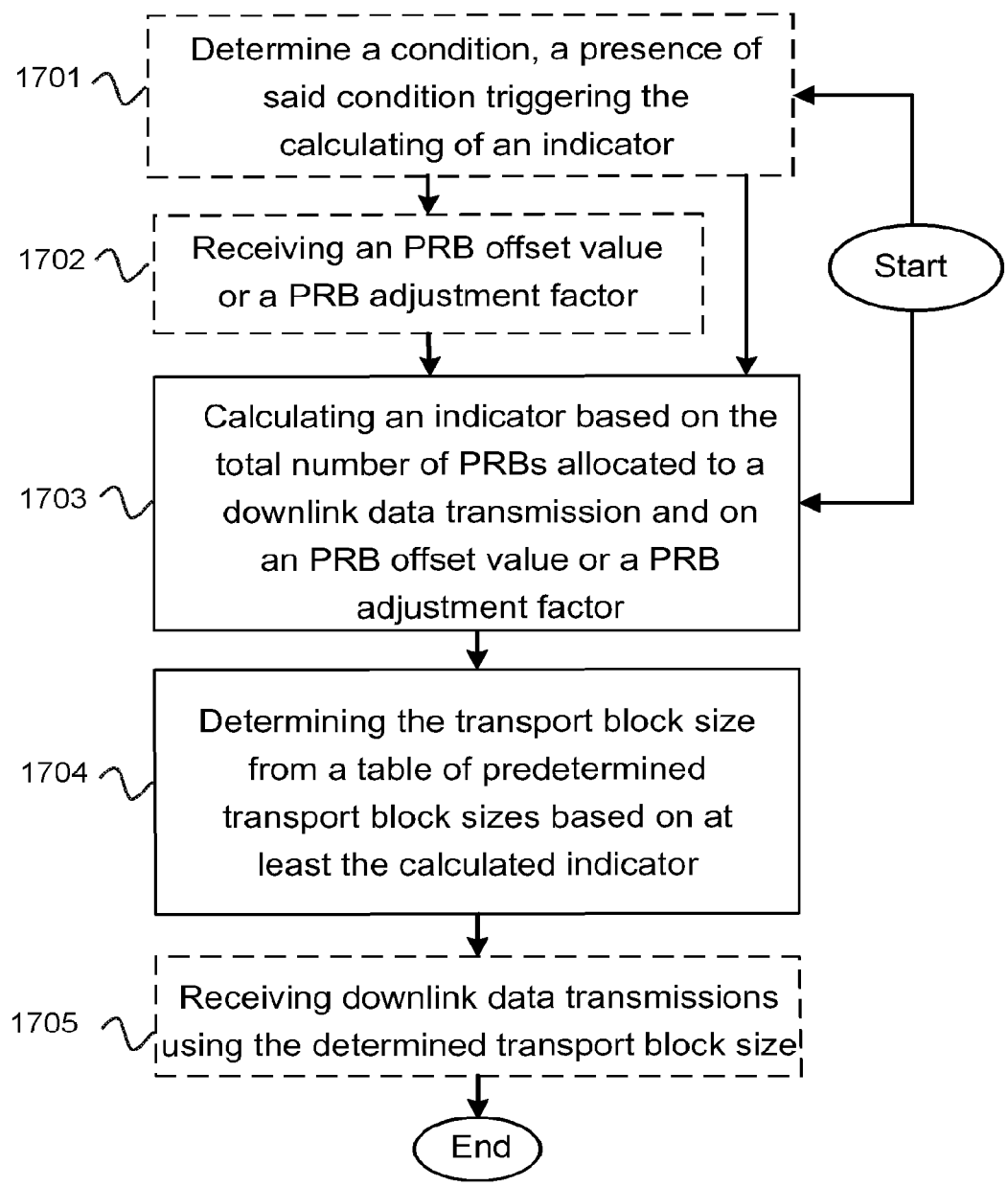
FIG. 17 is a flowchart depicting embodiments of a method in a user equipment.

FIG. 17 is an illustrating example of exemplary actions or operations which may be taken by a user equipment 121. It should be appreciated that the flowchart diagram is provided merely as an example and that the user equipment 121 may be configured to perform any of the exemplary actions or operations provided herein. It should be appreciated that the actions or operations illustrated below are merely examples, thus it is not necessary for all the actions or operations to be performed. It should also be appreciated that the actions or operations may be performed in any combination or suitable order. The flowchart in FIG. 17 comprises the following actions, and may also be implemented for any of the above and below mentioned embodiments or in any combination with those.

Action 1701

In this optional action, the user equipment 121 may determine a condition. The presence of the condition triggers the calculating of an indicator, e.g. the indicator $N_{PRB}$ described in Action 1703. In other words, the user equipment 121 may determine a condition to trigger the calculation of a modulated transport block size. This means that the user equipment 121 may determine a condition, a presence of said condition triggering the calculating of the indicator $N_{PRB}$.

In some embodiments, the condition may be that the user equipment 121 receives communications and/or a communication request on an eCCH from the network node 110. The eCCH may here be located in a user equipment-specific search space. In some embodiments, the user equipment 121 may determine a transport block size according to actions described below, when the user equipment 121 receives the downlink eCCH in the UE-specific search space. According to these embodiments, this means that the user equipment 121 may optionally not determine a transport block size according to actions described below, when it receives the downlink eCCH in the common search space.

In some embodiments, the condition may be that the user equipment 121 receives a request from the network node 110 to calculate the modulated transport block size. It should be noted that the calculation of the modulated transport block size may be considered as determining or obtaining the modulated transport block size.

Action 1702

This is an optional action. The user equipment 121 may here receive a PRB offset value $O_{PRB}$, or a PRB adjustment factor $A_{PRB}$. Alternatively, the user equipment 121 may be configured with values for the PRB offset value $O_{PRB}$, or the PRB adjustment factor $A_{PRB}$.

In some embodiments, the user equipment 121 may receive the PRB offset value $O_{PRB}$, or the PRB adjustment factor $A_{PRB}$, before the user equipment 121 starts to receive downlink data transmissions on the eCCH from the network node 110.

In some embodiments, the user equipment 121 may receive the PRB offset value $O_{PRB}$, or the PRB adjustment factor $A_{PRB}$, in an RRC message comprised in a downlink transmission from the network node 110 scheduled in a Physical Downlink Control CHannel, PDCCH. This means that the PRB offset value(s) $O_{PRB}$ or the PRB adjustment factor(s) $A_{PRB}$ may be configured with Radio Resource Control (RRC) signalling.

In other words, the user equipment 121 may retrieve computational parameters. In some embodiments, the user equipment 121 may retrieve the computational parameters from the received request, communication request or communication from the network node 110. This means that the communication request may comprise the PRB offset value $O_{PRB}$, or the PRB adjustment factor $A_{PRB}$. In some embodiments, the user equipment 121 may retrieve the computational parameters using downlink eCCHs. In some embodiments, different user equipments 121 may be configured with different PRB offset values $O_{PRB}$ or different the PRB adjustment factors $A_{PRB}$ via dedicated control signalling.

In some embodiments, the PRB offset value(s) $O_{PRB}$ or PRB adjustment factor(s) $A_{PRB}$ may also be given by a fixed value(s) in the user equipment 121. The fixed values of the PRB offset value(s) $O_{PRB}$ or PRB adjustment factor(s) $A_{PRB}$ may be used, for example, if the user equipment 121 is configured to use eCCH for at least one of the following downlink assignment, uplink grants, or power control.

In some embodiments, the user equipment 121 may apply default PRB offset values $O_{PRB}$, or adjustment factors $A_{PRB}$, that do not require explicit signalling from the network node 110, but are determined by the user equipment 121 based on e.g. the configured transmit mode, rank, CFI, number of CRS ports, number of configured PRB pairs for eCCH, etc. If the PRB offset(s) $O_{PRB}$ or adjustments factors $A_{PRB}$ are signalled to the user equipment 121 by the network node 110, the default PRB offset values $O_{PRB}$ or adjustment factors $A_{PRB}$ may be overridden through RRC signalling.

In some embodiments, the user equipment 121 may give a higher priority to the PRB offset values $O_{PRB}$, or the PRB adjustment factors $A_{PRB}$, that are received in a communication request from the network node 110, than to the PRB offset values $O_{PRB}$, or the PRB adjustment factors $A_{PRB}$, retrieved by the user equipment 121.

In some embodiments, more than one user equipment 121 may be configured with an identical PRB offset value $O_{PRB}$ or identical PRB adjustment factor via control signals addressing the more than one user equipment 121.

In summary, this action means that the user equipment 121 may retrieve the PRB offset value $O_{PRB}$, or the PRB adjustment factor $A_{PRB}$, used in calculating the indicator $N_{PRB}$ described in Action 1703.

Action 1703

In this action, the user equipment 121 calculates an indicator $N_{PRB}$ based on the total number of PRBs allocated to the downlink data transmission $N'_{PRB}$, and based on an PRB offset value $O_{PRB}$ or a PRB adjustment factor $A_{PRB}$. This is performed in order to achieve a more suitable indicator than total number of PRBs allocated to the downlink data transmission $N'_{PRB}$ in the actual TBS determination. It should be noted that the calculation of the indicator $N_{PRB}$ may be considered as determining or obtaining the indicator $N_{PRB}$.

In other words, the user equipment 121 may dynamically calculate a modulated transport block size. This means that the user equipment 121 uses at least one PRB offset value $O_{PRB}$, or at least one PRB adjustment factor $A_{PRB}$, in the actual TBS determination. The PRB offset value(s) $O_{PRB}$ may, for example, be a positive or a negative number(s). The adjustment factor $A_{PRB}$ may, for example, be larger or smaller than 1.

In the embodiments below, the user equipment 121 first calculates the total number of allocated PRBs, $N'_{PRB}$, based on the PRB resource allocation comprised in the downlink control and the procedure provided in the specification.

In some embodiments, the user equipment 121 applies a PRB offset value $O_{PRB}$ in the determination of the transport block size in all subframes.

In this case, if the transport block is transmitted in DwPTS of the special subframe in the frame structure, then the indicator $N_{PRB}$ may be calculated using the equation (Eq. 1) below:

$$N_{PRB}=\min\{\max\{\lfloor N'_{PRB} \times 0.75 \rfloor + O_{PRB}, 1\}, 110\} \qquad (Eq. 1)$$

Otherwise, in this case, the indicator $N_{PRB}$ may be calculated using the equation (Eq. 2) below:

$$N_{PRB}=\min\{\max\{\lfloor N'_{PRB} + O_{PRB} \rfloor, 1\}, 110\} \qquad (Eq. 2)$$

In some embodiments, the user equipment 121 applies a PRB offset value $O_{PRB}$ in the determination of TBS only in non-special subframes.

In this case, if the transport block is transmitted in DwPTS of the special subframe in the frame structure, then the indicator $N_{PRB}$ is calculated using the equation (Eq. 3) below:

$$N_{PRB}=\max\{\lfloor N'_{PRB} \times 0.75 \rfloor, 1\}, \qquad (Eq. 3)$$

Otherwise, in this case, the indicator $N_{PRB}$ may be calculated using the equation (Eq. 4) below:

$$N_{PRB}=\min\{\max\{N'_{PRB}+O_{PRB},1\},110\} \qquad (Eq. 4)$$

Here, in some embodiments, the user equipment 121 may apply different PRB offset values $O_{PRB}$ in the determination of TBS in different subframes based on the subframe number. This means that the user equipment 121 may comprise more than one PRB offset value $O_{PRB}$ and also may apply different PRB offset values $O_{PRB}$ in different subframes based on the subframe number of the subframes in the different subframes.

In some embodiments, the user equipment 121 may apply different PRB offset values $O_{PRB}$ in different subframes based on if there are additional reference signals present. Examples of such additional reference signals may be CSI reference signals or positioning reference signals. Other examples of such additional reference signals may be that the subframe comprises PDCCH, PHICH, PCFICH, PSS, SSS or PBCH. This means that the user equipment 121 may comprise more than one PRB offset value $O_{PRB}$ and further may apply different PRB offset values $O_{PRB}$ in different subframes based on the presence of additional signals.

It should also be noted that this calculation may be applied when the $N'_{RB}$ value is greater than the PRB threshold value, $T_{PRB}$. This means that, in some embodiments, the calculating which applies a PRB offset value $O_{PRB}$ in the determination of the transport block size is performed if $N'_{PRB}$ is larger than a physical resource block threshold $T_{PRB}$.

This may advantageously be used in order to reach certain peak rates. For instance, the PRB offset value $O_{PRB}$ applies only when $N'_{PRB}$ is equal to the total number of DL RBs in the system bandwidth minus one and the PRB offset value $O_{PRB}$ is then plus one. This ensures that the peak rate can be achieved when scheduled from eCCH.

In some embodiments, the user equipment 121 applies a PRB adjustment factor $A_{PRB}$ in the determination of the transport block size in all subframes.

In this case, if the transport block is transmitted in DwPTS of the special subframe in the frame structure, then the indicator $N_{PRB}$ may be calculated using the equation (Eq. 5) below:

$$N_{PRB}=\min\{\max\{\lfloor N'_{PRB} \times 0.75 \times A_{PRB} \rfloor, 1\}, 110\} \qquad (Eq. 5)$$

Otherwise, in this case, the indicator $N_{PRB}$ may be calculated using the equation (Eq. 6) below:

$$N_{PRB}=\min\{\max\{\lfloor N'_{PRB} \times A_{PRB} \rfloor, 1\}, 110\} \qquad (Eq. 6)$$

In some embodiments, the user equipment 121 applies a PRB adjustment factor $A_{PRB}$ in the determination of TBS only in non-special subframes.

In this case, if the transport block is transmitted in DwPTS of the special subframe in the frame structure, then the indicator $N_{PRB}$ may be calculated using the equation (Eq. 7) below:

$$N_{PRB}=\max\{\lfloor N'_{PRB} \times 0.75 \rfloor, 1\}, \qquad (Eq. 7)$$

Otherwise, in this case, the indicator $N_{PRB}$ may be calculated using the equation (Eq. 8) below:

$$N_{PRB}=\min\{\max\{\lfloor N'_{PRB} \times A_{PRB} \rfloor, 1\}, 110\} \qquad (Eq. 8)$$

Here, in some embodiments, the user equipment 121 may apply different PRB offset values $O_{PRB}$ in the determination of TBS in different subframes based on the subframe number. This means that the user equipment 121 may comprise more than one PRB adjustment factor $A_{PRB}$, and also may apply different PRB adjustment factors $A_{PRB}$ in different subframes based on the subframe number of the subframes in the different subframes.

In some embodiments, the user equipment 121 may apply different PRB offset values $O_{PRB}$ in different subframes based on if there are additional reference signals present. Examples of such additional reference signals may be CSI reference signals or positioning reference signals. Other examples of such additional reference signals may be that the subframe comprises PDCCH, PHICH, PCFICH, PSS, SSS or PBCH. This means that the user equipment 121 comprises more than one PRB adjustment factor $A_{PRB}$, and further may apply different PRB adjustment factors $A_{PRB}$, in different subframes based on the presence of additional signals.

It should also be noted that this calculation may be applied when the $N'_{PRB}$ value is greater than the PRB threshold value, $T_{PRB}$. This means that, in some embodiments, the calculating which applies a PRB adjustment factor $A_{PRB}$ in the determination of the transport block size is performed if $N'_{PRB}$ is larger than a physical resource block threshold $T_{PRB}$. This may advantageously be used in order to reach certain peak rates. For instance, the PRB adjustment factor $A_{PRB}$ applies only when $N'_{RB}$ is equal to the total number of DL RBs in the system bandwidth minus one and the PRB adjustment factor $A_{PRB}$ is then plus one. This ensures that the peak rate can be achieved when scheduled from eCCH.

Action 1704

In this action, the user equipment 121 determines the transport block size from the table of predetermined transport block sizes based on at least the calculated indicator $N_{PRB}$.

In some embodiments, the user equipment 121 applies a PRB offset value $O_{PRB}$ in the determination of the transport block size in all subframes.

In this case, if the transport block is transmitted in DwPTS of the special subframe in the frame structure, then the transport block size is determined by using the indicator $N_{PRB}$ is calculated using the equation Eq. 1 in Action 1703 as the column indicator in the table of predetermined transport block sizes, e.g. the transport block size table 7.1.7.2.1-1 in the in the standard specification 3GPP TS 36.213 "Physical Layer Procedures".

Otherwise, in this case, the transport block size is determined by using the indicator $N_{PRB}$ that is calculated using the equation Eq. 2 in Action 1703 as the column indicator in the table of predetermined transport block sizes, e.g. the transport block size table 7.1.7.2.1-1 in the in the standard specification 3GPP TS 36.213 "Physical Layer Procedures".

In some embodiments, the user equipment 121 applies a PRB offset value $O_{PRB}$ in the determination of TBS only in non-special subframes. In this case, if the transport block is transmitted in DwPTS of the special subframe in the frame structure, then the transport block size is determined by using the indicator $N_{PRB}$ is calculated using the equation Eq. 3 in Action 1703 as the column indicator in the table of predetermined transport block sizes, e.g. the transport block size table 7.1.7.2.1-1 in the in the standard specification 3GPP TS 36.213 "Physical Layer Procedures".

Otherwise, in this case, the transport block size is determined by using the indicator $N_{PRB}$ is calculated using the equation Eq. 4 in Action 1703 as the column indicator in the table of predetermined transport block sizes, e.g. the transport block size table 7.1.7.2.1-1 in the in the standard specification 3GPP TS 36.213 "Physical Layer Procedures".

In some embodiments, the user equipment 121 applies a PRB adjustment factor $A_{PRB}$ in the determination of the transport block size in all subframes.

In this case, if the transport block is transmitted in DwPTS of the special subframe in the frame structure, then the transport block size is determined by using the indicator $N_{PRB}$ is calculated using the equation Eq. 5 in Action 1703 as the column indicator in the table of predetermined transport block sizes, e.g. the transport block size table 7.1.7.2.1-1 in the in the standard specification 3GPP TS 36.213 "Physical Layer Procedures".

Otherwise, in this case, the transport block size is determined by using the indicator $N_{PRB}$ is calculated using the equation Eq. 6 in Action 1703 as the column indicator in the table of predetermined transport block sizes, e.g. the transport block size table 7.1.7.2.1-1 in the in the standard specification 3GPP TS 36.213 "Physical Layer Procedures".

In some embodiments, the user equipment 121 applies a PRB adjustment factor $A_{PRB}$ in the determination of TBS only in non-special subframes.

In this case, if the transport block is transmitted in DwPTS of the special subframe in the frame structure, then the transport block size is determined by using the indicator $N_{PRB}$ is calculated using the equation Eq. 7 in Action 1703 as the column indicator in the table of predetermined transport block sizes, e.g. the transport block size table 7.1.7.2.1-1 in the in the standard specification 3GPP TS 36.213 "Physical Layer Procedures".

Otherwise, in this case, the transport block size is determined by using the indicator $N_{PRB}$ is calculated using the equation Eq. 8 in Action 1703 as the column indicator in the table of predetermined transport block sizes, e.g. the transport block size table 7.1.7.2.1-1 in the in the standard specification 3GPP TS 36.213 "Physical Layer Procedures".

It should also be noted that according to some embodiments, if a user equipment 121 is configured to use eCCH for e.g. downlink assignments, uplink grants and power control, the user equipment 121 may determine its allocated transport block size $N_{PRB}$ at least for some assignments or grants by using at least one PRB offset value, $O_{PRB}$ or at least one PRB adjustment factor, $A_{PRB}$.

Action 1705

In this optional action, the user equipment 121 may receive downlink data transmissions using the determined transport block size. In other words, the user equipment 121 may receive the downlink data using the modulated transport block size.

Embodiments of a method in the network node 110 will now be described with reference to the flowchart depicted in FIG. 18. The flowchart in FIG. 18 describes a method in the network node 110 for determining a transport block size. The transport block size is used by the network node 110 in transmitting downlink data transmissions to the user equipment 121 on an enhanced control channel, eCCH. The network node 110 and the user equipment 121 are comprised in a telecommunications system. The network node 110 has access to a table of predetermined transport block sizes. The table of predetermined transport block sizes may, for example, be the TBS table 7.1.7.2.1-1 in the standard specification 3GPP TS 36.213 "Physical Layer Procedures".

Figure 18:
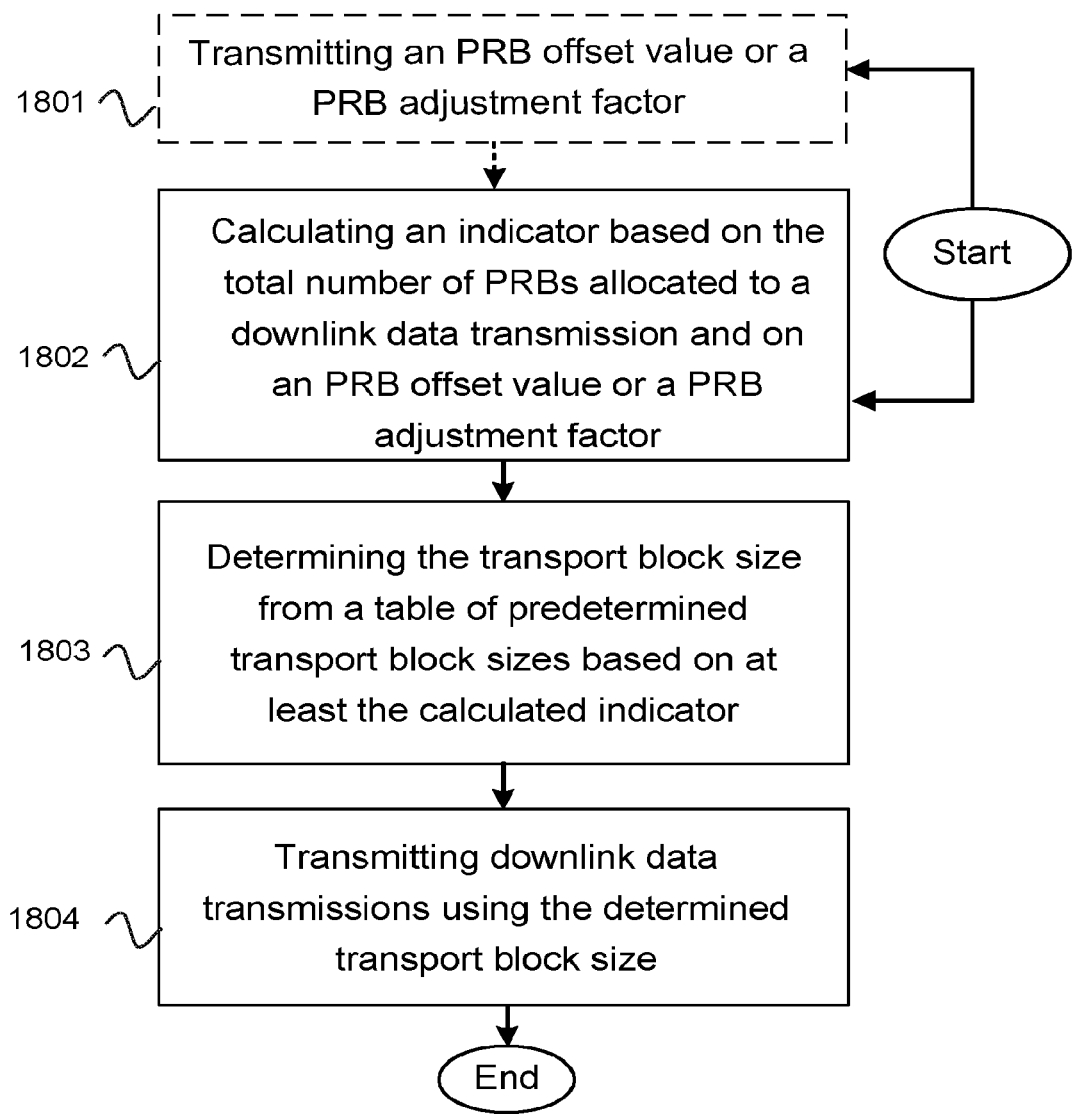
FIG. 18 is a flowchart depicting embodiments of a method in a network node.

FIG. 18 is an illustrating example of detailed exemplary actions or operations which may be taken by the network node 110. It should be appreciated that the flowchart diagram is provided merely as an example and that the network node 110 may be configured to perform any of the exemplary actions or operations provided herein. It should be appreciated that the actions or operations illustrated below are merely examples, thus it is not necessary for all the actions or operations to be performed. It should also be appreciated that the actions or operations may be performed in any combination. Hence, the flowchart in FIG. 18 comprises the following actions, and may also be implemented for any of the above and below mentioned embodiments or in any combination with those.

Action 1801

In this optional action, the network node 110 may transmit a communication request to the user equipment 121, which communication request comprises the PRB offset value $O_{PRB}$, or the PRB adjustment factor $A_{PRB}$.

Alternatively, in some embodiments, the network node 110 may transmit the PRB offset value $O_{PRB}$, or the PRB adjustment factor $A_{PRB}$, in an RRC message comprised in a downlink transmission scheduled in a PDCCH. This means that the PRB offset value(s) $O_{PRB}$ or the PRB adjustment factor(s) $A_{PRB}$ may be configured by the network node 110 with RRC signalling.

In some embodiments, the network node 110 may configure different user equipments with different PRB offset values $O_{PRB}$ or different the PRB adjustment factors $A_{PRB}$ via dedicated control signalling. Also, in some embodiments, the network node 110 may configure more than one user equipment 121 with an identical PRB offset value $O_{PRB}$ or identical PRB adjustment factor via control signals addressing the more than one user equipment 121.

In some embodiments, the network node 110 may transmit the PRB offset value $O_{PRB}$, or the PRB adjustment factor $A_{PRB}$, to the user equipment 121 before the user equipment 121 starts to receive downlink data transmissions on the eCCH from the network node 110. In some embodiments, the network node 110 may transmit the communication request and/or the communication on an eCCH. The eCCH may here be located in a user equipment-specific search space.

In some embodiments, the network node 110 may transmit a request to the user equipment 121 to calculate the modulated transport block size.

Action 1802

In this action, the network node 110 calculates an indicator $N_{PRB}$ based on the total number of PRBs allocated to the downlink data transmission $N'_{PRB}$, and based on an PRB offset value $O_{PRB}$, or a PRB adjustment factor $A_{PRB}$. It should be noted that the calculation of the indicator $N_{PRB}$ may be considered as determining or obtaining the indicator $N_{PRB}$.

These calculations may be performed by the network node 110 in the same way as described for the user equipment 121 in Action 1703. This means that the network node 110 may calculate the indicator $N_{PRB}$ according to any one of the equations Eq. 1-8 as described above in Action 1703. In some embodiments, this also means that the network node 110 may perform the calculations if $N'_{PRB}$ is larger than a physical resource block threshold $T_{PRB}$.

Action 1803

In this action, the network node 110 determines the transport block size from the table of predetermined transport block sizes based on at least the calculated indicator $N_{PRB}$. The determination may be performed by the network node 110 in the same way as described for the user equipment 121 in Action 1704.

Action 1804

In this action, the network node 110 transmit, to the user equipment 121, downlink data transmissions using the determined transport block size. In other words, the user equipment 121 may transmit downlink data using the modulated transport block size.

The example embodiments presented herein may be utilized in a radio network, which may further comprise network nodes, such as a base station 110, as illustrated in FIG. 19. The radio network may also comprise a user equipment 121, as illustrated in 20. It should be appreciated that the examples provided in FIGS. 19 and 20 are shown merely as non-limiting examples. According to the example embodiments, the network node 110 and user equipment 121 may be any other node as described in the examples provided in the above sections.

As shown in FIG. 19, the example network node 110 may comprise processing circuitry 1903, a memory 1902, radio circuitry 1901, and at least one antenna. The processing circuitry 1903 may comprise RF circuitry and baseband processing circuitry (not shown). In particular embodiments, some or all of the functionality described above as being provided by a mobile base station, a base station controller, a relay node, a NodeB, an enhanced NodeB, positioning node, and/or any other type of mobile communications node may be provided by the processing circuitry 1903 executing instructions stored on a computer-readable medium, such as the memory 1902 shown in FIG. 19. Alternative embodiments of the network node 110 may comprise additional components responsible for providing additional functionality, comprising any of the functionality identified above and/or any functionality necessary to support the solution described above. In other example embodiments, a network node may be not equipped with a radio interface or radio circuitry 1901.

It should also be appreciated that the processing circuitry, or any other hardware and/or software unit configured to execute operations and/or commands, of the network node 110 illustrated in FIG. 19 may be configured to configure to calculate a modified transport block size and/or provide computational parameters to be used in the calculation of a modified block size as described in the exemplary embodiments provided above.

An example of a user equipment 121 is provided in FIG. 14. The example user equipment 121 may comprise processing circuitry 2002, a memory 2003, radio circuitry 2001, and at least one antenna. The radio circuitry 2001 may comprise RF circuitry and baseband processing circuitry (not shown). In particular embodiments, some or all of the functionality described above as being provided by mobile communication devices or other forms of wireless device may be provided by the processing circuitry 2002 executing instructions stored on a computer-readable medium, such as the memory 2003 shown in FIG. 20. Alternative embodiments of the user equipment 121 may comprise additional components responsible for providing additional functionality, comprising any of the functionality identified above and/or any functionality necessary to support the solution described above.

It should be appreciated that the processing circuitry (or any other hardware and/or software unit configured to execute operations and/or commands) of the user equipment 121 may be configured to calculate a modified transport block size. The user equipment may be further configured to perform any of the exemplary operations described above.

To perform the method actions for determining a transport block size, the network node 110 comprises the following arrangement depicted in FIG. 19. FIG. 19 shows a schematic block diagram of embodiments of the network node 110.

The transport block size is used by the network node 110 in transmitting downlink data transmissions to the user equipment 121 on an eCCH. The network node 110 and the user equipment 121 are comprised in a telecommunications system 100. The network node 110 has access to a table of predetermined transport block sizes.

The network node 110 may comprise a radio circuitry 1901. The radio circuitry 1901 may be configured to transmit, to the user equipment 121, downlink data transmissions using the determined transport block size. The radio circuitry 1901 may also be configured to transmit a communication request to the user equipment 121. The communication request may comprise the PRB offset value $O_{PRB}$, or the PRB adjustment factor $A_{PRB}$.

The network node 110 comprises a processing circuitry 1903 configured to calculate an indicator $N_{PRB}$ based on the total number of PRBs allocated to the downlink data transmission $N'_{PRB}$, and on an PRB offset value $O_{PRB}$, or a PRB adjustment factor $A_{PRB}$. It should be noted that the calculation of the indicator $N_{PRB}$ may be considered as determining or obtaining the indicator $N_{PRB}$. The processing circuitry 1903 is further configured to determine the transport block size from the table of predetermined transport block sizes based on at least the calculated indicator $N_{PRB}$.

The processing circuitry 1903 may further be configured to calculate the indicator $N_{PRB}$ according to any one of the equations Eq. 1-8 as described above. Also, the processing circuitry 1903 may further be configured to perform the calculations if $N'_{PRB}$ is larger than a physical resource block threshold $T_{PRB}$.

To perform the method actions for determining a transport block size, the user equipment 121 comprises the following arrangement depicted in FIG. 20. FIG. 20 shows a schematic block diagram of embodiments of the user equipment 121.

The transport block size is used by the user equipment 121 in receiving downlink data transmissions from a network node 110 on an enhanced Control CHannel, eCCH. The user equipment 121 and the network node 110 are comprised in a telecommunications system 100. The user equipment 121 has access to a table of predetermined transport block sizes.

The user equipment 121 may further comprise a radio circuitry 2001. The radio circuitry 2101 may be configured to receive downlink data transmissions using the determined transport block size.

The user equipment 121 comprises a processing circuitry 2002 configured to calculate an indicator $N_{PRB}$ based on the total number of PRBs allocated to the downlink data transmission $N'_{PRB}$, and based on an PRB offset value $O_{PRB}$ or a PRB adjustment factor $A_{PRB}$. It should be noted that the calculation of the indicator $N_{PRB}$ may be considered as determining or obtaining the indicator $N_{PRB}$. The processing circuitry 2002 is further configured to determine the transport block size from the table of predetermined transport block sizes based on at least the calculated indicator $N_{PRB}$.

The processing circuitry 2002 may further be configured to determine a condition, a presence of said condition triggering the calculating of the indicator $N_{PRB}$. The condition may be receiving communications and/or a communication request on the eCCH. The eCCH may be located in a user equipment-specific search space. The condition may also be receiving a communication request from the network node 110 to calculate the transport block size. The communication request may comprise the PRB offset value $O_{PRB}$, or the PRB adjustment factor $A_{PRB}$.

The processing circuitry 2002 may further be configured to retrieve the PRB offset value $O_{PRB}$, or the PRB adjustment factor $A_{PRB}$, to be used in the calculation. The processing circuitry 2102 may further be configured to receive the PRB offset value $O_{PRB}$, or the PRB adjustment factor before the user equipment 121 starts to receive downlink data transmissions on the eCCH from the network node 110, or receive the PRB offset value $O_{PRB}$, or the PRB adjustment factor $A_{PRB}$, in an RRC message comprised in a downlink transmission from the network node 110 scheduled in a Physical Downlink Control CHannel, PDCCH.

The processing circuitry 2002 may further be configured to calculate the indicator $N_{PRB}$, according to any one of the equations Eq. 1-8 as described above.

The processing circuitry 2002 may further be configured to apply different PRB offset values $O_{PRB}$, or PRB adjustment factors $A_{PRB}$, in different subframes based on the subframe number, when the user equipment 121 comprises more than one PRB offset value $O_{PRB}$, or PRB adjustment factor $A_{PRB}$. Also, when the user equipment 121 comprises more than one PRB offset value $O_{PRB}$, or PRB adjustment factor $A_{PRB}$, the processing circuitry 2002 may further be configured to apply different PRB offset values $O_{PRB}$, or PRB adjustment factors $A_{PRB}$, in different subframes based on the presence of additional reference signals.

The processing circuitry 2002 may also be configured to perform the calculations if $N'_{PRB}$ is larger than a physical resource block threshold $T_{PRB}$. Furthermore, the processing circuitry 2002 may be configured to give PRB offset values $O_{PRB}$, or the PRB adjustment factors $A_{PRB}$, received in a communication request from the network node 110 a higher priority over PRB offset values $O_{PRB}$, or the PRB adjustment factors $A_{PRB}$, retrieved by the user equipment 121.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

Although the description is mainly given for a user equipment, as measuring or recording unit, it should be understood by the skilled in the art that "user equipment" is a non-limiting term which means any wireless device or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

ACK Acknowledgement
ARQ Automatic Repeat Request
CA Carrier Aggregation
CAZAC Constant Amplitude Zero Auto Correlation
CC Component Carrier
CCE Control Channel Element
CFI Control Format Indicator
CIF Carrier Indicator Field
C-RNTI Cell radio-network temporary identifier
CRS Common Reference Symbols
CSI Channel State Information
DCI Downlink Control Information
DL Downlink
DMRS Demodulation Reference Symbols
eCCH enhanced Control CHannel
ePDCCH enhanced PDCCH
HARQ Hybrid Automatic Repeat Request
LTE Long term evolution
MAC Medium Access Control
MIMO Multiple-Input Multiple-Output
NACK Non Acknowledgement
OFDM Orthogonal Frequency Division Multiple Access
PCC Primary Component Carrier
PDCCH Physical Downlink Control Channel
PDSCH Physical Downlink Shared Channel
PUCCH Physical Uplink Control Channel
RB or PRB Resource block
RE Resource Element
RNTI Radio-network temporary identifier
RS Reference Signal
SCC Secondary Component Carrier
SINR Signal-to-Noise Ratio
TPC Transmit Power Control
UE User equipment
UL Uplink

The invention claimed is:

1. A method in a user equipment for determining a transport block size, the user equipment being comprised in a telecommunications system, which user equipment has access to a table of predetermined transport block sizes for different number of allocated radio resource blocks, PRBs, the method comprising
   determining, by the user equipment, the transport block size from the table of predetermined transport block sizes based on at least an indicator $N_{PRB}$ defined based on a total number of PRBs allocated to the downlink data transmission $N'_{PRB}$ and based on a positive PRB offset value $O_{PRB}$; and
   receiving, from a network node, by the user equipment, downlink data transmissions using the transport block size, the downlink data transmissions being frequency multiplexed with an enhanced control channel (eCCH).

2. The method according to claim 1, wherein the step of determining is performed when the eCCH and the data transmission are scheduled in the allocated radio resource blocks.

3. The method according to claim 1, the method comprising:
   determining the transport block size from the table of determined transport block sizes based on the indicator $N_{PRB}$ equalling the total number of PRBs allocated to the downlink data transmission $N'_{PRB}$ when the eCCE is not scheduled in the allocated radio resource blocks.

4. The method according to claim 1, wherein the eCCH is received in a user equipment-specific search space.

5. The method according to claim 1, the method comprising
   calculating the indicator $N_{PRB}$ based on the total number of PRBs allocated to the downlink data transmission $N'_{PRB}$, and based on the positive PRB offset value $O_{PRB}$,
   wherein the step of determining (1704) the transport block size from the table of predetermined transport block sizes is performed based on at least the indicator $N_{PRB}$.

6. The method according to claim 5, wherein the calculating further comprises
   retrieving the PRB offset value $O_{PRB}$, used in calculating the indicator $N_{PRB}$.

7. The method according to claim 1, further comprising
   receiving the PRB offset value $O_{PRB}$, before the user equipment starts to receive downlink data transmissions multiplexed in frequency with the eCCH from the network node; or
   receiving the PRB offset value $O_{PRB}$, in an RRC message comprised in a downlink transmission from the network node scheduled by a Physical Downlink Control CHannel, PDCCH.

8. The method according to claim 1, wherein the indicator $N_{PRB}$ is defined by the total number of PRBs allocated to the downlink data transmission $N'_{PRB}$ plus the positive PRB offset value $O_{PRB}$.

9. A user equipment for determining a transport block size the user equipment being comprised in a telecommunications system, which user equipment has access to a table of predetermined transport block sizes for different number of allocated radio resource blocks, PRBs, the user equipment comprising:

processing circuitry configured to determine the transport block size from the table of predetermined transport block sizes based on at least an indicator $N_{PRB}$ defined based on a total number of PRBs allocated to the downlink data transmission $N'_{PRB}$ and based on a positive PRB offset values $O_{PRB}$; and radio circuitry configured to receive downlink data transmissions, from the network node, using the transport block size, the downlink data transmissions being frequency multiplexed with an enhanced control channel (eCCH).

10. The user equipment according to claim 9, wherein the processing circuitry is configured to determine when the eCCH and the data transmission are scheduled in the allocated radio resource blocks.

11. The user equipment according to claim 9, wherein the processing circuitry is configured to:

determine the transport block size from the table of determined transport block sizes based on the indicator $N_{PRB}$ equalling the total number of PRBs allocated to the downlink data transmission $N'_{PRB}$ when the eCCE is not scheduled in the allocated radio resource blocks.

12. The user equipment according to claim 9, wherein the eCCH is received in a user equipment-specific search space.

13. The user equipment according to claim 9, wherein the processing circuitry is configured to:

calculate the indicator $N_{PRB}$ based on the total number of PRBs allocated to the downlink data transmission $N'_{PRB}$, and based on the positive PRB offset value $O_{PRB}$, wherein the user equipment is adapted to perform the step of determining (1704) the transport block size from the table of predetermined transport block sizes based on at least the indicator $N'_{PRB}$.

14. The user equipment according to claim 13, wherein the processing circuitry is configured to calculate the indicator $N_{PRB}$ based on the total number of PRBs allocated to the downlink data transmission $N'_{PRB}$, and based on the positive PRB offset value $O_{PRB}$ comprises the user equipment further adapted to:

retrieve the PRB offset value $O_{PRB}$, used in calculating the indicator $N_{PRB}$.

15. The user equipment according to claim 9, wherein the processing circuitry is configured to:

receive the PRB offset value $O_{PRB}$, before the user equipment starts to receive downlink data transmissions multiplexed in frequency with the eCCH from the network node; or receive the PRB offset value $O'_{PRB}$, in an RRC message comprised in a downlink transmission from the network node scheduled by a Physical Downlink Control CHannel, PDCCH.

16. The user equipment according to claim 9, wherein the indicator $N_{PRB}$ is defined by the total number of PRBs allocated to the downlink data transmission $N'_{PRB}$ plus the positive PRB offset value $O_{PRB}$.

17. A method in a network node for determining a transport block size the network node being comprised in a telecommunications system, which network node has access to a table of predetermined transport block sizes for a number of allocated radio resource blocks, PRBs, the method comprising determining, by the network node, the transport block size from the table of predetermined transport block sizes based on at least an indicator $N_{PRB}$ defined based on a total number of PRBs allocated to the downlink data transmission $N'_{PRB}$ and based on a positive PRB offset value $O_{PRB}$; and transmitting to a user equipment, by the network node, downlink data transmissions using the transport block size, the downlink data transmissions being frequency multiplexed with an enhanced control channel (eCCH).

18. The method according to claim 17, wherein the step of determining is performed when the eCCH and the data transmission are scheduled in the allocated radio resource blocks.

19. The method according to claim 17, the method comprising determining the transport block size from the table of determined transport block sizes based on the indicator $N_{PRB}$ equalling the total number of PRBs allocated to the downlink data transmission $N'_{PRB}$ when the eCCE is not scheduled in the allocated radio resource blocks.

20. The method according to claim 17, the method comprising:

sending the PRB offset value $O_{PRB}$, before the user equipment starts to receive downlink data transmissions multiplexed in frequency with the eCCH from the network node; or sending the PRB offset value $O_{PRB}$, in an RRC message comprised in a downlink transmission from the network node scheduled by a Physical Downlink Control CHannel, PDCCH.

21. The method according to claim 17, wherein the indicator $N_{PRB}$ is defined by the total number of PRBs allocated to the downlink data transmission $N'_{PRB}$ plus the positive PRB offset value $O_{PRB}$.

22. The method according to claim 17, the method comprising calculating the indicator $N_{PRB}$ based on the total number of PRBs allocated to the downlink data transmission $N'_{PRB}$ and based on the positive PRB offset value $O_{PRB}$, wherein the determining the transport block size from the table of predetermined transport block sizes is performed based on at least the indicator $N_{PRB}$.

23. A network node for determining a transport block size, the network node being comprised in a telecommunications system, which network node has access to a table of predetermined transport block sizes for a number of allocated radio resource blocks, PRBs, the network node being comprising:

processing circuitry configured to determine the transport block size from the table of predetermined transport block sizes based on at least an indicator $N_{PRB}$ defined by a total number of PRBs allocated to the downlink data transmission $N'_{PRB}$ and on a positive PRB offset value $O_{PRB}$; and radio circuitry configured to transmit, to a user equipment, downlink data transmissions using the transport block size, the downlink data transmissions being frequency multiplexed with an enhanced control channel (eCCH).

24. The network node according to claim 23, wherein the processing circuitry is configured to determine when the eCCH and the data transmission are scheduled in the allocated radio resource blocks.

25. The network node according to claim 23, wherein the processing circuitry is configured to:
  determine the transport block size from the table of determined transport block sizes based on the indicator $N_{PRB}$ equalling the total number of PRBs allocated to the downlink data transmission $N'_{PRB}$ when the eCCE is not scheduled in the allocated radio resource blocks.

26. The network node according to claim 23, wherein the processing circuitry is configured to:
  send the PRB offset value $O_{PRB}$, before the user equipment starts to receive downlink data transmissions multiplexed in frequency with the eCCH from the network node; or
  send the PRB offset value $O_{PRB}$, in an RRC message comprised in a downlink transmission from the network node scheduled by a Physical Downlink Control CHannel, PDCCH.

27. The network node according to claim 23, wherein the indicator $N_{PRB}$ is defined by the total number of PRBs allocated to the downlink data transmission $N'_{PRB}$ plus the positive PRB offset value $O_{PRB}$.

28. The network node according to claim 23, wherein the processing circuitry is configured to:
  calculate the indicator $N_{PRB}$ based on the total number of PRBs allocated to the downlink data transmission $N'_{PRB}$ and based on the positive PRB offset value $O_{PRB}$,
  wherein the network node is adapted to determine the transport block size from the table of predetermined transport block sizes based on at least the indicator $N_{PRB}$.

* * * * *

UNITED STATES PATENT AND TRADEMARK OFFICE
CERTIFICATE OF CORRECTION

PATENT NO. : 10,021,681 B2
APPLICATION NO. : 15/385080
DATED : July 10, 2018
INVENTOR(S) : Larsson et al.

It is certified that error appears in the above-identified patent and that said Letters Patent is hereby corrected as shown below:

On the Title Page

In Item (57), under "ABSTRACT", in Column 2, Line 11, delete "$N_{PRB}$," and insert -- $N'_{PRB}$, --, therefor.

On Page 2, in Item (56), under "OTHER PUBLICATIONS", in Column 2, Line 8, delete "aspsect" and insert -- aspect --, therefor.

In the Drawings

In Fig. 7, Sheet 6 of 16, delete "[ 14 | 16QAM | 2.16 ]" and insert -- [ 14 | 16QAM | 2.16 ] --, therefor.

In the Specification

In Column 5, Line 35, delete "Configuration Indication" and insert -- Control Format Indicator --, therefor.

In Column 13, Line 51, delete "$N_{PRB}=\min\{\max\{\lfloor N'_{PRB}+O_{PRB},1\rfloor\},110\}$," and insert -- $N_{PRB}=\min\{\max\{N'_{PRB}+O_{PRB},1\},110\}$ --, therefor.

In Column 13, Line 60, delete "$N_{PRB}=\max\{\lfloor N'_{PRB}\times 0.75 \rfloor,1\}$," and insert -- $N_{PRB}=\max\{\lfloor N'_{PRB}\times 0.75 \rfloor,1\}$ --, therefor.

Signed and Sealed this
Second Day of October, 2018

Andrei Iancu
*Director of the United States Patent and Trademark Office*

CERTIFICATE OF CORRECTION (continued)
U.S. Pat. No. 10,021,681 B2

In Column 14, Line 19, delete "N'$_{RB}$" and insert -- N'$_{PRB}$ --, therefor.

In Column 14, Line 51, delete "$N_{PRB}=\max\{\lfloor N'_{PRB} \times 0.75 \rfloor, 1\}$," and insert -- $N_{PRB}=\max\{\lfloor N'_{PRB} \times 0.75 \rfloor, 1\}$ --, therefor.

In Column 15, Line 17, delete "N'$_{RB}$" and insert -- N'$_{PRB}$ --, therefor.

In Column 15, Line 35, delete "in the in the standard" and insert -- in the standard --, therefor.

In Column 15, Line 41, delete "in the in the standard" and insert -- in the standard --, therefor.

In Column 15, Line 51, delete "in the in the standard" and insert -- in the standard --, therefor.

In Column 15, Line 57, delete "in the in the standard" and insert -- in the standard --, therefor.

In Column 16, Line 1, delete "in the in the standard" and insert -- in the standard --, therefor.

In Column 16, Line 7, delete "in the in the standard" and insert -- in the standard --, therefor.

In Column 16, Line 19, delete "in the in the standard" and insert -- in the standard --, therefor.

In Column 16, Line 25, delete "in the in the standard" and insert -- in the standard --, therefor.

In Column 18, Lines 32-33, delete "FIG. 14." and insert -- FIG. 20. --, therefor.

In Column 19, Lines 59-60, delete "processing circuitry 2102" and insert -- processing circuitry 2002 --, therefor.

In Column 19, Lines 61-62, delete "factor before" and insert -- factor A$_{PRB}$, before --, therefor.

In Column 20, Line 2, delete "N$_{PRB}$," and insert -- N$_{PRB}$ --, therefor.

In Column 21, Line 65, delete "Multiple Access" and insert -- Multiplexing --, therefor.

In Column 22, Line 3, delete "Resource block" and insert -- Resource block or Physical Resource block --, therefor.

In Column 22, Line 8, delete "Signal-to-Noise Ratio" and insert -- Signal-to-Interference-Plus-Noise Ratio --, therefor.

In the Claims

In Column 22, Line 48, in Claim 5, delete "determining (1704) the" and insert -- determining the --, therefor.

CERTIFICATE OF CORRECTION (continued)
U.S. Pat. No. 10,021,681 B2

In Column 23, Line 12, in Claim 9, delete "values $O_{PRB}$; and" and insert -- value $O_{PRB}$; and --, therefor.

In Column 23, Line 40, in Claim 13, delete "determining (1704) the" and insert -- determining the --, therefor.

In Column 23, Line 42, in Claim 13, delete "$N'_{PRB}$." and insert -- $N_{PRB}$. --, therefor.

In Column 23, Line 57, in Claim 15, delete "$O'_{PRB}$," and insert -- $O_{PRB}$, --, therefor.